(12) United States Patent
Dorner

(10) Patent No.: US 11,779,906 B2
(45) Date of Patent: Oct. 10, 2023

(54) EXHAUST GAS TREATMENT SYSTEM FOR ULTRA LOW NOX AND COLD START

(71) Applicant: BASF Corporation, Florham Park, NJ (US)

(72) Inventor: Robert Dorner, Hannover (DE)

(73) Assignee: BASF Corporation, Florham Park, NJ (US)

( * ) Notice: Subject to any disclaimer, the term of this patent is extended or adjusted under 35 U.S.C. 154(b) by 41 days.

(21) Appl. No.: 17/594,773

(22) PCT Filed: Apr. 27, 2020

(86) PCT No.: PCT/EP2020/061596
§ 371 (c)(1),
(2) Date: Oct. 29, 2021

(87) PCT Pub. No.: WO2020/221682
PCT Pub. Date: Nov. 5, 2020

(65) Prior Publication Data
US 2022/0203336 A1    Jun. 30, 2022

(30) Foreign Application Priority Data

Apr. 29, 2019   (EP) .................................. 19171571

(51) Int. Cl.
| | |
|---|---|
| *B01J 23/44* | (2006.01) |
| *B01J 23/30* | (2006.01) |
| *B01J 35/04* | (2006.01) |
| *B01J 21/06* | (2006.01) |
| *B01J 29/76* | (2006.01) |
| *B01J 23/22* | (2006.01) |
| *B01J 23/42* | (2006.01) |
| *B01D 53/94* | (2006.01) |
| *F01N 3/20* | (2006.01) |
| *F01N 3/28* | (2006.01) |
| *F01N 13/00* | (2010.01) |

(52) U.S. Cl.
CPC ............ *B01J 23/44* (2013.01); *B01D 53/944* (2013.01); *B01D 53/9418* (2013.01); *B01D 53/9431* (2013.01); *B01D 53/9436* (2013.01); *B01D 53/9477* (2013.01); *B01J 21/063* (2013.01); *B01J 21/066* (2013.01); *B01J 23/22* (2013.01); *B01J 23/30* (2013.01); *B01J 23/42* (2013.01); *B01J 29/763* (2013.01); *B01J 35/04* (2013.01); *F01N 3/2066* (2013.01); *F01N 3/2803* (2013.01); *F01N 13/0093* (2014.06); *B01D 2255/1023* (2013.01); *B01D 2255/20707* (2013.01); *B01D 2255/20715* (2013.01); *B01D 2255/20723* (2013.01); *B01D 2255/50* (2013.01); *B01D 2255/902* (2013.01); *B01D 2255/904* (2013.01); *F01N 2370/04* (2013.01); *F01N 2610/02* (2013.01); *F01N 2610/03* (2013.01); *F01N 2610/1453* (2013.01)

(58) Field of Classification Search
CPC ........ B01J 23/44; B01J 21/063; B01J 21/066; B01J 23/22; B01J 23/30; B01J 23/42; B01J 29/763; B01J 35/04; F01N 13/0093; F01N 3/2066; F01N 3/2803; F01N 2370/04; F01N 2610/02; F01N 2610/03; F01N 2610/1453; B01D 53/9418; B01D 53/9431; B01D 53/9436; B01D 53/944; B01D 53/9477; B01D 2255/1023; B01D 2255/20707; B01D 2255/20715; B01D 2255/20723; B01D 2255/50; B01D 2255/902; B01D 2255/904
See application file for complete search history.

(56) References Cited

U.S. PATENT DOCUMENTS

| | | | |
|---|---|---|---|
| 10,054,023 B2 | 8/2018 | Nilsson | |
| 10,344,647 B2 | 7/2019 | Nilsson | |
| 2009/0260346 A1* | 10/2009 | Gekas | ...................... F01N 3/035 60/274 |
| 2011/0283680 A1* | 11/2011 | Gekas | ...................... F01N 9/002 60/274 |
| 2012/0107204 A1* | 5/2012 | Cox | ...................... B01J 23/8926 502/325 |

FOREIGN PATENT DOCUMENTS

| | | | | |
|---|---|---|---|---|
| EP | 2 230 001 A1 * | 9/2010 | ............. | B01D 53/94 |
| WO | WO 2012/037342 A1 * | 3/2012 | ............. | B01J 29/72 |
| WO | 2018/224651 A2 | 12/2018 | | |

OTHER PUBLICATIONS

International Search Report dated Jul. 2, 2020, PCT/EP2020/061596.

* cited by examiner

*Primary Examiner* — Timothy C Vanoy
(74) *Attorney, Agent, or Firm* — DLA Piper LLP (US)

(57) ABSTRACT

The present disclosure relates to an exhaust gas treatment system for treating an exhaust gas stream leaving an internal combustion engine, wherein said exhaust gas treatment system comprises (i) a first catalyst comprising a coating and a first substrate, wherein the coating comprises a vanadium oxide supported on a first oxidic support comprising titanium; (ii) a hydrocarbon injector for injecting a fluid comprising hydrocarbons into the exhaust gas stream exiting the outlet end of the first catalyst according to (i); (iii) a second catalyst comprising a coating and a second substrate, wherein the coating comprises palladium on a second oxidic support comprising one or more of zirconium, silicon, aluminum and titanium.

15 Claims, 10 Drawing Sheets

EXHAUST GAS TREATMENT SYSTEM FOR ULTRA LOW NOX AND COLD START

This application is a national stage filing under 35 U.S.C. § 371 of International Application No. PCT/EP2020/061596, filed on Apr. 27, 2020, which claims the benefit of priority to European Application No. 19171571.3, filed Apr. 29, 2019; the disclosure of each of these applications are each incorporated herein by reference in their entirety.

The present invention relates to an exhaust gas treatment system for treating an exhaust gas stream leaving an internal combustion engine comprising a first vanadium containing catalyst, a hydrocarbon injector and a second catalyst, to a process for preparing the first vanadium containing catalyst and to a method for treating an exhaust gas leaving an internal combustion engine using said exhaust gas treatment system.

For instant, it is known that systems comprising close-coupled SCR (ccSCR) are designed to meet Ultra low NOx and $N_2O$ emissions (such as CARB). US 2018/0258811 A1 discloses an exhaust treatment system comprising a first reduction catalyst device comprising a coating comprising a zeolite activated with copper, the first reduction catalyst device being the first active component in the exhaust treatment system and a second reduction catalyst device comprising vanadium. US 2017/0152780 A1 discloses an exhaust treatment system comprising a first reduction catalyst device, a particulate filter, at least partially comprising a catalytically oxidizing coating downstream of the first reduction catalyst device to catch soot particles and to oxidize one or several of nitrogen oxide, and a second reduction catalyst device for reducing NOx downstream of the filter.

The ccSCR (if based on Cu-Zeolite SCR) may be sulfated with time even though there is no upstream oxidation catalyst, namely due to $SO_3$ from engine and internally generated over the SCR. With time the ccSCR will therefore not be able to provide sufficient DeNOx to meet the Ultra low emissions. WO 2018/224651 A2 discloses an exhaust gas treatment system comprising a first catalyst comprising palladium supported on an oxidic material and a SCR component, the first catalyst being the first active component of the system, and downstream a second catalyst comprising a platinum group metal and one or more of a vanadium oxide and a zeolitic material comprising one or more of copper and iron. However, there was still a need to provide exhaust gas treatment systems that prevent sulfating and exhibit improved DeNOx to meet the environmental requirements, while being cost effective.

Therefore, it was an object of the present invention to provide exhaust gas treatment systems that prevent sulfating, improve general robustness to chemical fouling and poisoning, exhibit improved DeNOx to meet the environmental requirements, in particular by having a fast DeNOx response under transient conditions, while being cost effective. Surprisingly, it was found that the exhaust gas treatment system according to the present invention prevents sulfating, improves general robustness to chemical fouling and poisoning, exhibits improved DeNOx to meet the environmental requirements, in particular by having a fast DeNOx response under transient conditions, while being cost effective Therefore, the present invention relates to an exhaust gas treatment system for treating an exhaust gas stream leaving an internal combustion engine, said exhaust gas treatment system having an upstream end for introducing said exhaust gas stream into said exhaust gas treatment system, wherein said exhaust gas treatment system comprises (i) a first catalyst having an inlet end and an outlet end and comprising a coating and a first substrate, wherein the first substrate has an inlet end, an outlet end and a substrate axial length extending from the inlet end to the outlet end of the first substrate and comprises a plurality of passages defined by internal walls, wherein the interface between the passages and the internal walls is defined by the surface of the internal walls, wherein the coating is disposed on the surface of the internal walls of the first substrate and the coating comprises a vanadium oxide supported on a first oxidic support comprising titanium;

(ii) a hydrocarbon injector for injecting a fluid comprising hydrocarbons into the exhaust gas stream exiting the outlet end of the first catalyst according to (i);

(iii) a second catalyst having an inlet end and an outlet end and comprising a coating and a second substrate, wherein the second substrate has an inlet end, an outlet end and a substrate axial length extending from the inlet end to the outlet end of the second substrate and comprises a plurality of passages defined by internal walls, wherein the interface between the passages and the internal walls is defined by the surface of the internal walls, wherein the coating is disposed on the surface of the internal walls of the second substrate and the coating comprises palladium on a second oxidic support comprising one or more of zirconium, silicon, aluminum and titanium;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (iii) is located downstream of the first catalyst according to (i) and downstream of the hydrocarbon injector according to (ii) and wherein the inlet end of the second catalyst is arranged upstream of the outlet end of the second catalyst.

It is preferred that the outlet end of the first catalyst according to (i) is in fluid communication with the inlet end of the second catalyst according to (iii) and that between the outlet end of the first catalyst according to (i) and the inlet end of the second catalyst according to (iii), no catalyst for treating the exhaust gas stream exiting the first catalyst is located in the exhaust gas treatment system.

It is preferred that the first catalyst comprises a nitrogen oxide (NOx) reduction component.

It is preferred that the vanadium oxide comprised in the first catalyst is one or more of a vanadium (V) oxide, a vanadium (IV) oxide and a vanadium (III) oxide.

As to the coating of the first catalyst, it is preferred that said coating comprises the vanadium oxide at an amount in the range of from 1.0 to 10 weight-%, more preferably in the range of from 2.0 to 8.0 weight-%, more preferably in the range of from 2.5 to 6.0 weight-%, based on the weight of the first oxidic support.

It is preferred that the first oxidic support comprising titanium further comprises one or more of tungsten, silicon, zirconium and antimony, more preferably one or more of tungsten, silicon and antimony. It is more preferred that the first oxidic support further comprises tungsten and silicon. Alternatively, it is more preferred that the first oxidic support further comprises antimony and silicon.

Therefore, the present invention preferably relates to an exhaust gas treatment system for treating an exhaust gas stream leaving an internal combustion engine, said exhaust gas treatment system having an upstream end for introducing said exhaust gas stream into said exhaust gas treatment system, wherein said exhaust gas treatment system comprises (i) a first catalyst having an inlet end and an outlet end and comprising a coating and a first substrate, wherein the first substrate has an inlet end, an outlet end and a substrate axial length extending from the inlet end to the outlet end of the first substrate and comprises a plurality of passages defined by internal walls, wherein the interface between the passages and the internal walls is defined by the surface of the internal walls, wherein the coating is disposed on the surface of the internal walls of the first substrate and the coating comprises a vanadium oxide supported on a first oxidic support comprising titanium, wherein the coating comprises the vanadium oxide at an amount in the range of from 1.0 to 10 weight-%, more preferably in the range of from 2.0 to 8.0 weight-%, based on the weight of the first oxidic support and wherein the first oxidic support comprising titanium further comprises one or more of tungsten, silicon, zirconium and antimony, more preferably one or more of tungsten, silicon and antimony;

(ii) a hydrocarbon injector for injecting a fluid comprising hydrocarbons into the exhaust gas stream exiting the outlet end of the first catalyst according to (i);

(iii) a second catalyst having an inlet end and an outlet end and comprising a coating and a second substrate, wherein the second substrate has an inlet end, an outlet end and a substrate axial length extending from the inlet end to the outlet end of the second substrate and comprises a plurality of passages defined by internal walls, wherein the interface between the passages and the internal walls is defined by the surface of the internal walls, wherein the coating is disposed on the surface of the internal walls of the second substrate and the coating comprises palladium on a second oxidic support comprising one or more of zirconium, silicon, aluminum and titanium;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (iii) is located downstream of the first catalyst according to (i) and downstream of the hydrocarbon injector according to (ii) and wherein the inlet end of the second catalyst is arranged upstream of the outlet end of the second catalyst.

In the context of the present invention, it is preferred that from 80 to 98 weight-%-%, more preferably from 85 to 95 weight-%, of the first oxidic support consist of titania. It is more preferred that from 2 to 10 weight-%, more preferably from 5 to 15 weight-%, of the first oxidic support consist of tungsten and silicon, calculated as $WO_3$ and $SiO_2$. Alternatively, it is more preferred that from 2 to 10 weight-%, more preferably from 5 to 15 weight-%, of the first oxidic support consist of antimony and silicon, calculated as $Sb_2O_3$ and $SiO_2$.

It is preferred that the coating of the first catalyst comprises the first oxidic support at a loading in the range of from 1 to 10 g/in$^3$, more preferably in the range of from 2 to 7 g/in$^3$, more preferably in the range of from 3 to 5.5 g/in$^3$.

It is preferred that the coating of the first catalyst further comprises an oxidic binder. It is more preferred that the oxidic binder is selected from the group consisting of alumina, silica, zirconia, and mixture of two or more thereof, more preferably selected from the group consisting of alumina, silica and mixture of two or more thereof, more preferably silica.

It is preferred that the coating of the first catalyst comprises an oxidic binder, more preferably the oxidic binder disclosed in the foregoing, at an amount in the range of from 0.5 to 10 weight-%, more preferably in the range of from 2 to 8 weight-%, more preferably in the range of from 3 to 6 weight-%, based on the weight of the first oxidic support.

As to the first catalyst, it is preferred that its coating comprises a vanadium oxide supported on a first oxidic support comprising titanium, more preferably titania, wherein more preferably the first oxidic support further comprises tungsten and silicon, wherein said coating more preferably further comprises an oxidic binder as defined in the foregoing.

In the context of the present invention, it is preferred that from 95 to 100 weight-%, more preferably from 98 to 100 weight-%, more preferably from 99 to 100 weight-%, more preferably from 99.5 to 100 weight-%, of the coating of the first catalyst consist of a vanadium oxide supported on a first oxidic support comprising titanium, more preferably titania, and more preferably an oxidic binder as defined in the foregoing. It is more preferred that the first oxidic support further comprises tungsten and silicon.

It is preferred that at most 0.001 weight-%, more preferably from 0 to 0.001 weight-%, more preferably from 0 to 0.0001 weight-%, more preferably from 0 to 0.00001 weight-% of the coating of the first catalyst consist of palladium, preferably of palladium and rhodium, more preferably of palladium, platinum and rhodium, more preferably of platinum group metals.

It is preferred that at most 0.1 weight-%, more preferably from 0 to 0.1 weight-%, more preferably from 0 to 0.01 weight-%, more preferably from 0 to 0.001 weight-% of the coating of the first catalyst consist of a zeolitic material, more preferably of a molecular sieve.

It is preferred that the first substrate comprises, more preferably consist of, one or more of a cordierite, an aluminum titanate and a silicon carbide, preferably one or more of a cordierite and a silicon carbide, more preferably a cordierite.

It is preferred that the first substrate preferably is a wall-flow filter substrate or a flow-through substrate, more preferably a flow-though substrate, more preferably a cordierite flow-through substrate.

Alternatively, it is preferred that the first substrate comprises, more preferably consist of, a metallic substance, wherein the metallic substance more preferably comprises, more preferably consists of, oxygen and one or more of iron, chromium and aluminum. It is more preferred that the first substrate is a wall-flow filter substrate or a flow-through substrate, more preferably a flow-though substrate, more preferably a metallic flow-through substrate.

It is preferred that the first catalyst comprises the coating at a loading in the range of from 1.5 to 12 g/in$^3$, more preferably in the range of from 2.5 to 8 g/in$^3$, more preferably in the range of from 3.5 to 6 g/in$^3$.

It is preferred that the coating of the first catalyst extends over 95 to 100%, more preferably over 98 to 100%, more preferably over 99 to 100%, of the first substrate axial length.

It is preferred that the first catalyst according to (i) consists of the coating and the first substrate.

As to the second catalyst according to (iii), it is preferred that the second oxidic support comprised in the coating of the second catalyst comprises one or more of zirconium and aluminum, more preferably aluminum, and optionally zirconium.

It is preferred that from 90 to 100 weight-%, more preferably from 95 to 100 weight-%, more preferably from 98 to 100 weight-%, more preferably from 99 to 100 weight-%, of the second oxidic support of the coating of the second catalyst consist of aluminum, oxygen and optionally zirconium.

It is more preferred that from 60 to 95 weight-%, more preferably from 75 to 85 weight-%, of the second oxidic support consist of alumina and from 5 to 40 weight-%, more preferably from 15 to 25 weight-%, of the second oxidic support consist of zirconia.

It is preferred that the coating of the second catalyst according to (iii) comprises the second oxidic support at a loading in the range of from 0.25 to 5 g/in$^3$, more preferably in the range of from 0.5 to 5 g/in$^3$, more preferably in the range of from 0.75 to 4 g/in$^3$, more preferably in the range of from 1 to 2 g/in$^3$.

It is preferred that the coating of the second catalyst according to (iii) comprises palladium at an amount in the range of from 5 to 90 g/ft$^3$, more preferably in the range of from 10 to 70 g/ft$^3$, more preferably in the range of from 30 to 60 g/ft$^3$.

As to the second catalyst, it is preferred that palladium is the only platinum group metal present in the coating of the second catalyst according to (iii).

It is preferred that the second substrate comprises, more preferably consist of, one or more of a cordierite, an aluminum titanate and a silicon carbide, more preferably one or more of a cordierite and a silicon carbide, more preferably a cordierite.

It is preferred that the second substrate is a wall-flow filter substrate or a flow-through substrate, more preferably a flow-though substrate, more preferably a cordierite flow-through substrate.

Alternatively, it is preferred that the second substrate comprises, more preferably consist of, a metallic substance, wherein the metallic substance more preferably comprises, more preferably consists of, oxygen and one or more of iron, chromium and aluminum. It is more preferred that the second substrate is a wall-flow filter substrate or a flow-through substrate, more preferably a flow-though substrate, more preferably a metallic flow-through substrate.

It is preferred that the second catalyst according to (iii) consists of the coating and the second substrate.

It is preferred that at most 0.1 weight-%, more preferably from 0 to 0.1 weight-%, more preferably from 0 to 0.01 weight-%, more preferably from 0 to 0.001 weight-% of the coating of the second catalyst consist of a vanadium oxide.

As to the second catalyst according to (iii), it is preferred that its coating comprises palladium supported on the second oxidic support comprising one or more of zirconium, silicon, aluminum and titanium, more preferably aluminum and zirconium.

It is preferred that from 98 to 100 weight-%, more preferably from 99 to 100 weight-%, more preferably from 99.5 to 100 weight-%, of the coating of the second catalyst consist of palladium supported on the second oxidic support comprising one or more of zirconium, silicon, aluminum and titanium, more preferably aluminum and zirconium.

Therefore, the present invention preferably relates to an exhaust gas treatment system for treating an exhaust gas stream leaving an internal combustion engine, said exhaust gas treatment system having an upstream end for introducing said exhaust gas stream into said exhaust gas treatment system, wherein said exhaust gas treatment system comprises (i) a first catalyst having an inlet end and an outlet end and comprising a coating and a first substrate, wherein the first substrate has an inlet end, an outlet end and a substrate axial length extending from the inlet end to the outlet end of the first substrate and comprises a plurality of passages defined by internal walls, wherein the interface between the passages and the internal walls is defined by the surface of the internal walls, wherein the coating is disposed on the surface of the internal walls of the first substrate and the coating comprises a vanadium oxide supported on a first oxidic support comprising titanium,
   wherein the coating comprises the vanadium oxide at an amount in the range of from 1.0 to 10 weight-%, more preferably in the range of from 2.0 to 8.0 weight-%, based on the weight of the first oxidic support and wherein the first oxidic support comprising titanium further comprises one or more of tungsten, silicon, zirconium and antimony, more preferably one or more of tungsten, silicon and antimony;

(ii) a hydrocarbon injector for injecting a fluid comprising hydrocarbons into the exhaust gas stream exiting the outlet end of the first catalyst according to (i);

(iii) a second catalyst having an inlet end and an outlet end and comprising a coating and a second substrate, wherein the second substrate has an inlet end, an outlet end and a substrate axial length extending from the inlet end to the outlet end of the second substrate and comprises a plurality of passages defined by internal walls, wherein the interface between the passages and the internal walls is defined by the surface of the internal walls, wherein the coating is disposed on the surface of the internal walls of the second substrate and the coating comprises palladium on a second oxidic support comprising one or more of aluminum and zirconium, wherein from 98 to 100 weight-% of the coating of the second catalyst consist of palladium supported on the second oxidic support comprising one or more of aluminum and zirconium;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (iii) is located downstream of the first catalyst according to (i) and downstream of the hydrocarbon injector according to (ii) and wherein the inlet end of the second catalyst is arranged upstream of the outlet end of the second catalyst.

It is preferred that at most 0.1 weight-%, more preferably from 0 to 0.1 weight-%, more preferably from 0 to 0.01 weight-%, more preferably from 0 to 0.001 weight-% of the coating of the second catalyst consist of a zeolitic material, more preferably of a molecular sieve.

In the context of the present invention, according to an alternative, it is preferred that the coating of the second catalyst according to (iii) further comprises a zeolitic material, the zeolitic material comprising one or more of Cu and Fe.

It is preferred that the zeolitic material comprised in the coating of the second catalyst has a framework type AEI, GME, CHA, MFI, BEA, FAU, MOR or mixtures of two or more thereof, more preferably a framework type AEI, CHA, BEA or mixtures of two or more thereof, more preferably a framework type CHA or AEI, more preferably a framework type CHA.

It is preferred that the zeolitic material comprised in the coating of the second catalyst comprises copper, wherein the amount of copper comprised in the zeolitic material, calculated as CuO, more preferably is in the range of from 0.5 to 10 weight-%, more preferably in the range of from 1 to 7 weight-%, more preferable in the range of from 2.5 to 6 weight-%, based on the total weight of the zeolitic material. It is more preferred that the amount of iron in the zeolitic material, calculated as $Fe_2O_3$, is in the range of from 0 to 0.01 weight-%, more preferably from 0 to 0.001 weight-%, more preferably from 0 to 0.0001 weight-%, based on the total weight of the zeolitic material.

It is preferred that from 95 to 100 weight-%, more preferably from 98 to 100 weight-%, more preferably from 99 to 100 weight-%, more preferably from 99.5 to 100 weight-%, of the framework structure of the zeolitic material comprised in the coating of the second catalyst consist of Si, Al, O and H, wherein in the framework structure, the molar ratio of Si to Al, calculated as molar $SiO_2$: $Al_2O_3$, more preferably is in the range of from 2:1 to 50:1, more preferably in the range of from 4:1 to 45:1, more preferably in the range of from 10:1 to 40:1, more preferably in the range of from 15:1 to 35:1.

It is preferred that the zeolitic material comprised in the coating of the second catalyst comprises iron, wherein the amount of iron comprised in the zeolitic material, calculated as $Fe_2O_3$, more preferably is in the range of from 0.1 to 10.0 weight-%, more preferably in the range of from 1.0 to 7.0 weight-%, more preferably in the range of from 2.5 to 5.5 weight-% based on the total weight of the zeolitic material. It is more preferred that from 95 to 100 weight-%, more preferably from 98 to 100 weight-%, more preferably from 99 to 100 weight-%, more preferably from 99.5 to 100 weight-%, of the framework structure of the zeolitic material consist of Si, Al, O and H, wherein in the framework structure, the molar ratio of Si to Al, calculated as molar $SiO_2$: $Al_2O_3$, more preferably is in the range of from 2:1 to 50:1, more preferably in the range of from 4:1 to 45:1, more preferably in the range of from 10:1 to 40:1, more preferably in the range of from 15:1 to 35:1.

It is preferred that the zeolitic material comprised in the coating of the second catalyst, more preferably which has a framework type CHA, has a mean crystallite size of at least 0.1 micrometer, more preferably in the range of from 0.1 to 3.0 micrometers, more preferably in the range of from 0.3 to 1.5 micrometer, more preferably in the range of from 0.4 to 1.0 micrometer determined via scanning electron microscope.

It is preferred that the coating of the second catalyst comprises the zeolitic material at a loading in the range of from 0.2 to 8 $g/in^3$, more preferably in the range of from 0.5 to 6 $g/in^3$, more preferably in the range of from 1 to 4 $g/in^3$ and that the coating of the second catalyst according to (iii) comprises the second oxidic support at a loading in the range of from 0.3 to 0.75 $g/in^3$, more preferably in the range of from 0.4 to 0.6 $g/in^3$.

As to the coating of the second catalyst which comprises a zeolitic material, it is preferred that said coating further comprises an oxidic binder. It is more preferred that the oxidic binder is selected from the group consisting of alumina, silica, zirconia, and mixture of two or more thereof, more preferably selected from the group consisting of alumina, zirconia and mixture of two or more thereof, more preferably zirconia. It is more preferred that the coating of the second catalyst comprises the oxidic binder at an amount in the range of from 0.5 to 10 weight-%, more preferably in the range of from 2 to 8 weight-%, more preferably in the range of from 3 to 6 weight-%, based on the total weight of the zeolitic material.

It is preferred that from 95 to 100 weight-%, more preferably from 98 to 100 weight-%, more preferably from 99 to 100 weight-%, more preferably from 99.5 to 100 weight-%, of the coating of the second catalyst consist of palladium on the second oxidic support comprising one or more of zirconium, silicon, aluminum and titanium, a zeolitic material comprising one or more of Cu and Fe, and more preferably an oxidic binder as defined in the foregoing.

In the context of the present invention, it is preferred that the second catalyst comprises the coating at a loading in the range of from 0.3 to 5 $g/in^3$, more preferably in the range of from 1 to 4 $g/in^3$, more preferably in the range of from 1.5 to 4.6 $g/in^3$.

It is preferred that the coating of the second catalyst preferably extends over 95 to 100%, more preferably over 98 to 100%, more preferably over 99 to 100%, of the second substrate axial length.

It is preferred that the system of the present invention further comprises
(iv) a third catalyst having an inlet end and an outlet end and comprising a coating and a third substrate, wherein the third substrate has an inlet end, an outlet end and a substrate axial length extending from the inlet end to the outlet end of the third substrate and comprises a plurality of passages defined by internal walls, wherein the interface between the passages and the internal walls is defined by the surface of the internal walls, wherein the coating is disposed on the surface of the internal walls of the third substrate and the coating comprises one or more of a vanadium oxide and a zeolitic material comprising one or more of Cu and Fe;
wherein in the exhaust gas treatment system, the third catalyst according to (iv) is located downstream of the second catalyst according to (iii) and wherein the inlet end of the third catalyst is arranged upstream of the outlet end of the third catalyst.

Therefore, the present invention preferably relates to an exhaust gas treatment system for treating an exhaust gas stream leaving an internal combustion engine, said exhaust gas treatment system having an upstream end for introducing said exhaust gas stream into said exhaust gas treatment system, wherein said exhaust gas treatment system comprises
(i) a first catalyst having an inlet end and an outlet end and comprising a coating and a first substrate, wherein the first substrate has an inlet end, an outlet end and a substrate axial length extending from the inlet end to the outlet end of the first substrate and comprises a plurality of passages defined by internal walls, wherein the interface between the passages and the internal walls is defined by the surface of the internal walls, wherein the coating is disposed on the surface of the internal walls of the first substrate and the coating comprises a vanadium oxide supported on a first oxidic support comprising titanium;

(ii) a hydrocarbon injector for injecting a fluid comprising hydrocarbons into the exhaust gas stream exiting the outlet end of the first catalyst according to (i);

(iii) a second catalyst having an inlet end and an outlet end and comprising a coating and a second substrate, wherein the second substrate has an inlet end, an outlet end and a substrate axial length extending from the inlet end to the outlet end of the second substrate and comprises a plurality of passages defined by internal walls, wherein the interface between the passages and the internal walls is defined by the surface of the internal walls, wherein the coating is disposed on the surface of the internal walls of the second substrate and the coating comprises palladium on a second oxidic support comprising one or more of zirconium, silicon, aluminum and titanium;

(iv) a third catalyst having an inlet end and an outlet end and comprising a coating and a third substrate, wherein the third substrate has an inlet end, an outlet end and a substrate axial length extending from the inlet end to the outlet end of the third substrate and comprises a plurality of passages defined by internal walls, wherein the interface between the passages and the internal walls is defined by the surface of the internal walls, wherein the coating is disposed on the surface of the internal walls of the third substrate and the coating comprises one or more of a vanadium oxide and a zeolitic material comprising one or more of Cu and Fe;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (iii) is located downstream of the first catalyst according to (i) and downstream of the hydrocarbon injector according to (ii) and wherein the inlet end of the second catalyst is arranged upstream of the outlet end of the second catalyst;

wherein in the exhaust gas treatment system, the third catalyst according to (iv) is located downstream of the second catalyst according to (iii) and wherein the inlet end of the third catalyst is arranged upstream of the outlet end of the third catalyst.

In the context of the present invention, it is preferred that the outlet end of the second catalyst according to (iii) is in fluid communication with the inlet end of the third catalyst according to (iv) and that between the outlet end of the second catalyst according to (iii) and the inlet end of the third catalyst according to (iv), no catalyst for treating the exhaust gas stream exiting the second catalyst is located in the exhaust gas treatment system.

As to the third catalyst according to (iv), according to a first aspect, it is preferred that the coating of the third catalyst according to (iv) comprises a zeolitic material comprising one or more of Cu and Fe.

It is preferred that the zeolitic material comprised in the coating of the third catalyst has a framework type AEI, GME, CHA, MFI, BEA, FAU, MOR or mixtures of two or more thereof, preferably a framework type AEI, CHA, BEA or mixtures of two or more thereof, more preferably a framework type CHA or AEI. It is more preferred that the zeolitic material comprised in the coating of the third catalyst has a framework type CHA.

It is preferred that the zeolitic material comprised in the coating of the third catalyst comprises copper, wherein the amount of copper comprised in the zeolitic material, calculated as CuO, more preferably is in the range of from 0.5 to 10 weight-%, more preferably from 1 to 8 weight-%, more preferably from 2 to 7 weight-%, more preferable from 3 to 6 weight-%, based on the total weight of the zeolitic material. It is more preferred that the amount of iron in the zeolitic material, calculated as $Fe_2O_3$, is in the range of from 0 to 0.01 weight-%, more preferably from 0 to 0.001 weight-%, more preferably from 0 to 0.0001 weight-%, based on the total weight of the zeolitic material.

It is preferred that from 95 to 100 weight-%, more preferably from 98 to 100 weight-%, more preferably from 99 to 100 weight-%, more preferably from 99.5 to 100 weight-%, of the framework structure of the zeolitic material comprised in the coating of the third catalyst consist of Si, Al, O and H, wherein in the framework structure, the molar ratio of Si to Al, calculated as molar $SiO_2:Al_2O_3$, more preferably is in the range of from 2:1 to 50:1, more preferably in the range of from 4:1 to 45:1, more preferably in the range of from 10:1 to 40:1, more preferably in the range of from 15:1 to 35:1.

It is preferred that the zeolitic material comprised in the coating of the third catalyst comprises iron, wherein the amount of iron comprised in the zeolitic material, calculated as $Fe_2O_3$, more preferably is in the range of from 0.1 to 10.0 weight-%, more preferably in the range of from 1.0 to 7.0 weight-%, more preferably in the range of from 2.5 to 5.5 weight-% based on the total weight of the zeolitic material. It is more preferred that from 95 to 100 weight-%, more preferably from 98 to 100 weight-%, more preferably from 99 to 100 weight-%, more preferably from 99.5 to 100 weight-%, of the framework structure of the zeolitic material consist of Si, Al, O and H, wherein in the framework structure, the molar ratio of Si to Al, calculated as molar $SiO_2: Al_2O_3$, more preferably is in the range of from 2:1 to 50:1, more preferably in the range of from 4:1 to 45:1, more preferably in the range of from 10:1 to 40:1, more preferably in the range of from 15:1 to 35:1.

It is preferred that the zeolitic material comprised in the coating of the third catalyst, more preferably which has a framework type CHA, has a mean crystallite size of at least 0.1 micrometer, more preferably in the range of from 0.1 to 3.0 micrometers, more preferably in the range of from 0.3 to 1.5 micrometer, more preferably in the range of from 0.4 to 1.0 micrometer determined via scanning electron microscope.

It is more preferred that the coating of the third catalyst comprises the zeolitic material at a loading in the range of from 0.5 to 8 $g/in^3$, more preferably in the range of from 0.75 to 5 $g/in^3$, more preferably in the range of from 1 to 3.5 $g/in^3$.

It is preferred that the coating of the third catalyst according to (iv) further comprises an oxidic binder.

It is preferred that the oxidic binder is selected from the group consisting of alumina, silica, zirconia, and mixture of two or more thereof, more preferably selected from the group consisting of alumina, zirconia and mixture of two or more thereof, more preferably zirconia.

It is preferred that the coating of the third catalyst comprises the oxidic binder at an amount in the range of from 0.5 to 10 weight-%, more preferably in the range of from 2 to 8 weight-%, more preferably in the range of from 3 to 6 weight-%, based on the total weight of the zeolitic material.

As to the third catalyst according to (iv) according to the first aspect, it is preferred that the coating comprises a zeolitic material comprising one or more of Cu and Fe, wherein the zeolitic material has a framework type AEI, GME, CHA, MFI, BEA, FAU, MOR or mixtures of two or more thereof, more preferably a framework type AEI, CHA, BEA or mixtures of two or more thereof, more preferably a framework type CHA or AEI, more preferably a framework type CHA and more preferably that the coating further comprises an oxidic binder.

It is preferred that at most 0.001 weight-%, more preferably from 0 to 0.001 weight-%, more preferably from 0 to 0.0001 weight-%, more preferably from 0 to 0.00001 weight-% of the coating of the third catalyst consist of palladium, platinum and rhodium, preferably of platinum group metals.

It is preferred that at most 0.1 weight-%, more preferably from 0 to 0.1 weight-%, more preferably from 0 to 0.01 weight-%, more preferably from 0 to 0.001 weight-% of the coating of the third catalyst consist of a vanadium oxide.

It is preferred that from 95 to 100 weight-%, more preferably from 98 to 100 weight-%, more preferably from 99 to 100 weight-%, more preferably from 99.5 to 100 weight-%, of the coating of the third catalyst consist of a zeolitic material comprising one or more of Cu and Fe, and more preferably an oxidic binder as defined in the foregoing.

In the context of the present invention, it is preferred that the coating of the second catalyst according to (iii) comprises, more preferably consists of, palladium supported on the second oxidic support comprising one or more of zirconium, silicon, aluminum and titanium, more preferably aluminum and optionally zirconium, and that the coating of the third catalyst according to (iv) comprises, more preferably consists of, a zeolitic material comprising one or more of Cu and Fe, and more preferably an oxidic binder as defined in the foregoing.

Therefore, the present invention preferably relates to an exhaust gas treatment system for treating an exhaust gas stream leaving an internal combustion engine, said exhaust gas treatment system having an upstream end for introducing said exhaust gas stream into said exhaust gas treatment system, wherein said exhaust gas treatment system comprises (i) a first catalyst having an inlet end and an outlet end and comprising a coating and a first substrate, wherein the first substrate has an inlet end, an outlet end and a substrate axial length extending from the inlet end to the outlet end of the first substrate and comprises a plurality of passages defined by internal walls, wherein the interface between the passages and the internal walls is defined by the surface of the internal walls, wherein the coating is disposed on the surface of the internal walls of the first substrate and the coating comprises a vanadium oxide supported on a first oxidic support comprising titanium,
wherein the coating comprises the vanadium oxide at an amount in the range of from 1.0 to 10 weight-%, more preferably in the range of from 2.0 to 8.0 weight-%, based on the weight of the first oxidic support and wherein the first oxidic support comprising titanium further comprises one or more of tungsten, silicon, zirconium and antimony, more preferably one or more of tungsten, silicon and antimony;

(ii) a hydrocarbon injector for injecting a fluid comprising hydrocarbons into the exhaust gas stream exiting the outlet end of the first catalyst according to (i);

(iii) a second catalyst having an inlet end and an outlet end and comprising a coating and a second substrate, wherein the second substrate has an inlet end, an outlet end and a substrate axial length extending from the inlet end to the outlet end of the second substrate and comprises a plurality of passages defined by internal walls, wherein the interface between the passages and the internal walls is defined by the surface of the internal walls, wherein the coating is disposed on the surface of the internal walls of the second substrate and the coating comprises palladium on a second oxidic support comprising one or more of zirconium, silicon, aluminum and titanium, more preferably aluminum and optionally zirconium;

(iv) a third catalyst having an inlet end and an outlet end and comprising a coating and a third substrate, wherein the third substrate has an inlet end, an outlet end and a substrate axial length extending from the inlet end to the outlet end of the third substrate and comprises a plurality of passages defined by internal walls, wherein the interface between the passages and the internal walls is defined by the surface of the internal walls, wherein the coating is disposed on the surface of the internal walls of the third substrate and the coating comprises a zeolitic material comprising one or more of Cu and Fe, and more preferably an oxidic binder as defined in the foregoing;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (iii) is located downstream of the first catalyst according to (i) and downstream of the hydrocarbon injector according to (ii) and wherein the inlet end of the second catalyst is arranged upstream of the outlet end of the second catalyst;

wherein in the exhaust gas treatment system, the third catalyst according to (iv) is located downstream of the second catalyst according to (iii) and wherein the inlet end of the third catalyst is arranged upstream of the outlet end of the third catalyst according to the first aspect.

As to third coating according to (iv) according to a second aspect, it is preferred that the coating of the third catalyst comprises a vanadium oxide, wherein the vanadium oxide is one or more of a vanadium (V) oxide, a vanadium (IV) oxide and a vanadium (III) oxide.

It is more preferred that the vanadium is supported on a third oxidic support, wherein the coating of the third catalyst more preferably comprises the vanadium oxide at an amount in the range of from 1.5 to 10 weight-%, more preferably in the range of from 2.5 to 8 weight-%, more preferably in the range of from 3 to 6 weight-%, based on the weight of the third oxidic support.

It is preferred that the third oxidic support comprises titanium, wherein the third oxidic support further comprises one or more of tungsten, silicon, zirconium and antimony, preferably one or more of tungsten, silicon and antimony. It is more preferred that the third oxidic support further comprises tungsten and silicon or the third oxidic support further comprises antimony and silicon.

It is more preferred that from 80 to 98 weight-%, more preferably from 85 to 95 weight-%, of the third oxidic support consist of titania. It is more preferred that from 2 to 10 weight-%, more preferably from 5 to 15 weight-%, of the third oxidic support consist of tungsten and silicon, calculated as $WO_3$ and $SiO_2$. Alternatively, it is more preferred that from 2 to 10 weight-%, more preferably from 5 to 15 weight-%, of the third oxidic support consist of antimony and silicon, calculated as $Sb_2O_3$ and $SiO_2$.

It is preferred that the coating of the third catalyst comprises the third oxidic support at a loading in the range of from 1 to 10 $g/in^3$, more preferably in the range of from 2 to 7 $g/in^3$, more preferably in the range of from 3 to 5.5 $g/in^3$.

As to the coating of the third catalyst comprising a vanadium oxide, it is preferred that the coating of the third catalyst further comprises an oxidic binder. It is more preferred that the oxidic binder is selected from the group consisting of alumina, silica, zirconia, and mixture of two or more thereof, more preferably selected from the group consisting of alumina, silica and mixture of two or more thereof, more preferably silica.

It is preferred that the coating comprises the oxidic binder at an amount in the range of from 0.5 to 10 weight-%, more preferably in the range of from 2 to 8 weight-%, more preferably in the range of from 3 to 6 weight-%, based on the weight of the third oxidic support.

As to the third coating according to (iv) according to the second aspect, it is preferred that the coating of the third catalyst further comprises a platinum group metal component, wherein the platinum group metal component is one or more of palladium, platinum and rhodium, more preferably one or more of palladium and platinum.

It is preferred that said platinum group metal component is platinum and palladium, wherein the weight ratio of platinum relative to palladium, calculated as elemental platinum group metal, Pt:Pd, more preferably is in the range of from 2:1 to 18:1, more preferably in the range of from 5:1 to 15:1, more preferably in the range of from 8:1 to 12:1.

It is preferred that the coating of the third catalyst comprises the platinum group metal component at a loading in the range of from 1 to 30 $g/ft^3$, more preferably in the range of from 2 to 15 $g/ft^3$, more preferably in the range of from 5 to 12 $g/ft^3$.

It is preferred that said platinum group metal component is supported on an oxidic material, wherein the oxidic material more preferably is one of more of alumina, silica, zirconia and titania, more preferably is one or more of alumina, silica and zirconia, more preferably is one or more of alumina and silica, wherein the oxidic material more preferably is alumina doped with zirconia. It is more preferred that the coating of the third catalyst comprises the oxidic material supporting the platinum group metal component at a loading in the range of from 0.1 to 4 $g/in^3$, more preferably in the range of from 0.2 to 2 $g/in^3$, more preferably in the range of from 0.5 to 1.5 $g/in^3$.

As to third catalyst according to (iv) according to the second aspect, it is preferred that from 95 to 100 weight-%, more preferably from 98 to 100 weight-%, more preferably from 99 to 100 weight-%, more preferably from 99.5 to 100 weight-%, of the coating of the third catalyst consist of a platinum group component, more preferably supported on an oxidic material as defined in the foregoing, and a vanadium oxide supported on a third oxidic support, and more preferably an oxidic binder as defined in the foregoing.

As to third catalyst according to (iv) according to the second aspect, it is preferred that from 95 to 100 weight-%, more preferably from 98 to 100 weight-%, more preferably from 99 to 100 weight-%, more preferably from 99.5 to 100 weight-%, of the coating of the third catalyst consist of a platinum group component, more preferably supported on an oxidic material as defined in the foregoing, and a zeolitic material comprising one or more of Cu and Fe, and preferably an oxidic binder as in the foregoing.

In the context of the present invention, as to the third catalyst according to (iv), it is preferred that the third substrate comprises, more preferably consist of, one or more of a cordierite, an aluminum titanate and a silicon carbide, more preferably one or more of a cordierite and a silicon carbide, more preferably a cordierite.

It is preferred that the third substrate is a wall-flow filter substrate or a flow-through substrate, more preferably a flow-though substrate, more preferably a cordierite flow-through substrate. Alternatively, the third substrate could be metallic as indicated for the first and second substrates in the foregoing.

It is preferred that the third catalyst comprises the coating at a loading in the range of from 0.75 to 10 $g/in^3$, more preferably in the range of from 1 to 7 $g/in^3$, more preferably in the range of from 1.5 to 5.5 $g/in^3$.

It is preferred that the coating of the third catalyst extends over 95 to 100%, more preferably over 98 to 100%, more preferably over 99 to 100%, of the third substrate axial length.

As to the third substrate of the third catalyst, it is preferred that it has a substrate length in the range of from 2.54 to 25.4 cm (1 to 10 inches), more preferably in the range of from 3.81 to 17.78 cm (1.5 to 7 inches), more preferably in the range of from 5.08 to 10.16 cm (2 to 4 inches).

It is preferred that the third substrate of the third catalyst has a substrate width in the range of from 10.16 to 43.18 cm (4 to 17 inches), more preferably in the range of from 17.78 to 38.10 cm (7 to 15 inches), more preferably in the range of from 22.86 to 30.48 cm (9 to 12 inches).

It is preferred that the third catalyst according to (iv) consists of the coating and the third substrate.

As to the first substrate of the first catalyst, it is preferred that it has a substrate length in the range of from 2.54 to 25.4 cm (1 to 10 inches), more preferably in the range of from 5.08 to 20.32 cm (2 to 8 inches), more preferably in the range of from 7.62 to 15.24 cm (3 to 6 inches).

It is preferred that the first substrate of the first catalyst has a substrate width in the range of from 2.54 to 50.8 cm (1 to 20 inches), more preferably in the range of from 12.7 to 43.18 cm (5 to 17 inches), more preferably in the range of from 20.32 to 38.1 cm (8 to 15 inches).

As to the second substrate of the second catalyst, it is preferred that it has a substrate length in the range of from 2.54 to 25.4 cm (1 to 10 inches), more preferably in the range of from 3.81 to 17.78 cm (1.5 to 7 inches), more preferably in the range of from 5.08 to 10.16 cm (2 to 4 inches).

It is preferred that the second substrate of the second catalyst has a substrate width in the range of from 10.16 to 50.8 cm (4 to 20 inches), more preferably in the range of from 17.78 to 43.18 cm (7 to 17 inches), more preferably in the range of from 22.86 to 38.1 cm (9 to 15 inches).

In the context of the present invention, it is preferred that the system further comprises a fourth catalyst, wherein the fourth catalyst is one or more of an ammonia oxidation catalyst, a catalyzed soot filter and a selective catalytic reduction catalyst.

It is preferred that the fourth catalyst is an ammonia oxidation catalyst, wherein the fourth catalyst has an inlet end and an outlet end and comprises a coating and a fourth substrate. The fourth substrate has an inlet end, an outlet end and a substrate axial length extending from the inlet end to the outlet end of the fourth substrate and comprises a plurality of passages defined by internal walls, wherein the interface between the passages and the internal walls is defined by the surface of the internal walls. The coating of the fourth catalyst is disposed on the surface of the internal walls of the fourth substrate and the coating comprises an ammonia oxidation component. In the exhaust gas treatment system, the fourth catalyst is located downstream of the third catalyst according to (iv) and the inlet end of the fourth catalyst is arranged upstream of the outlet end of the fourth catalyst. The outlet end of the third catalyst according to (iv) is in fluid communication with the inlet end of the fourth catalyst and between the outlet end of the third catalyst and the inlet end of the fourth catalyst, no catalyst for treating the exhaust gas exiting the third catalyst is located in the exhaust gas treatment system.

It is preferred that the ammonia oxidation component of the coating of the fourth catalyst comprises a platinum group metal component and one or more of a vanadium oxide and a zeolitic material comprising one or more of Cu and Fe, more preferably a platinum group metal component and a zeolitic material comprising one or more of Cu and Fe.

It is preferred that the ammonia oxidation component of the coating of the fourth catalyst comprises, more preferably consists of, a platinum group metal component, more preferably one or more of palladium and platinum, supported on an oxidic support and a zeolitic material, more preferably having a framework type CHA, comprising Cu.

Therefore, the present invention preferably relates to an exhaust gas treatment system for treating an exhaust gas stream leaving an internal combustion engine, said exhaust gas treatment system having an upstream end for introducing said exhaust gas stream into said exhaust gas treatment system, wherein said exhaust gas treatment system comprises (i) a first catalyst having an inlet end and an outlet end and comprising a coating and a first substrate, wherein the first substrate has an inlet end, an outlet end and a substrate axial length extending from the inlet end to the outlet end of the first substrate and comprises a plurality of passages defined by internal walls, wherein the interface between the passages and the internal walls is defined by the surface of the internal walls, wherein the coating is disposed on the surface of the internal walls of the first substrate and the coating comprises a vanadium oxide supported on a first oxidic support comprising titanium,
  wherein the coating more preferably comprises the vanadium oxide at an amount in the range of from 1.0 to 10 weight-%, more preferably in the range of from 2.0 to 8.0 weight-%, based on the weight of the first oxidic support and wherein the first oxidic support comprising titanium more preferably further comprises one or more of tungsten, silicon, zirconium and antimony, more preferably one or more of tungsten, silicon and antimony;

(ii) a hydrocarbon injector for injecting a fluid comprising hydrocarbons into the exhaust gas stream exiting the outlet end of the first catalyst according to (i);

(iii) a second catalyst having an inlet end and an outlet end and comprising a coating and a second substrate, wherein the second substrate has an inlet end, an outlet end and a substrate axial length extending from the inlet end to the outlet end of the second substrate and comprises a plurality of passages defined by internal walls, wherein the interface between the passages and the internal walls is defined by the surface of the internal walls, wherein the coating is disposed on the surface of the internal walls of the second substrate and the coating comprises palladium on a second oxidic support comprising one or more of zirconium, silicon, aluminum and titanium;

(iv) a third catalyst having an inlet end and an outlet end and comprising a coating and a third substrate, wherein the third substrate has an inlet end, an outlet end and a substrate axial length extending from the inlet end to the outlet end of the third substrate and comprises a plurality of passages defined by internal walls, wherein the interface between the passages and the internal walls is defined by the surface of the internal walls, wherein the coating is disposed on the surface of the internal walls of the third substrate and the coating comprises a zeolitic material comprising one or more of Cu and Fe;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (iii) is located downstream of the first catalyst according to (i) and downstream of the hydrocarbon injector according to (ii) and wherein the inlet end of the second catalyst is arranged upstream of the outlet end of the second catalyst;

wherein in the exhaust gas treatment system, the third catalyst according to (iv) is located downstream of the second catalyst according to (iii) and wherein the inlet end of the third catalyst is arranged upstream of the outlet end of the third catalyst according to the first aspect;

wherein the system further comprises a fourth catalyst, wherein the fourth catalyst is one or more of an ammonia oxidation catalyst, a catalyzed soot filter and a selective catalytic reduction catalyst, more preferably an ammonia oxidation catalyst, wherein the fourth catalyst has an inlet end and an outlet end and comprises a coating and a fourth substrate;

wherein the fourth substrate has an inlet end, an outlet end and a substrate axial length extending from the inlet end to the outlet end of the fourth substrate and comprises a plurality of passages defined by internal walls, wherein the interface between the passages and the internal walls is defined by the surface of the internal walls, wherein the coating of the fourth catalyst is disposed on the surface of the internal walls of the fourth substrate and the coating comprises an ammonia oxidation component;

wherein, in the exhaust gas treatment system, the fourth catalyst is located downstream of the third catalyst according to (iv) and the inlet end of the fourth catalyst is arranged upstream of the outlet end of the fourth catalyst and wherein the outlet end of the third catalyst according to (iv) is in fluid communication with the inlet end of the fourth catalyst and between the outlet end of the third catalyst and the inlet end of the fourth catalyst, no catalyst for treating the exhaust gas exiting the third catalyst is located in the exhaust gas treatment system.

In the context of the present invention, it is preferred that the system of the present invention further comprises a fifth catalyst, wherein the fifth catalyst is one or more of an ammonia oxidation catalyst, a diesel oxidation catalyst, a catalyzed soot filter and a selective catalytic reduction catalyst, more preferably a catalyzed soot filter.

It is preferred that the fifth catalyst has an inlet end and an outlet end and comprises a coating on a fifth substrate, more preferably a wall-flow filter substrate, wherein in the exhaust gas treatment system, the fifth catalyst is located downstream of the fourth catalyst and wherein the inlet end of the fifth catalyst is arranged upstream of the outlet end of the fifth catalyst, wherein the outlet end of the fourth catalyst is in fluid communication with the inlet end of the fifth catalyst and wherein between the outlet end of the fourth catalyst and the inlet end of the fifth catalyst, no catalyst for treating the exhaust gas exiting the fourth catalyst is located in the exhaust gas treatment system.

It is preferred that the system of the present invention further comprises a sixth catalyst, wherein the sixth catalyst is one or more of an ammonia oxidation catalyst, a catalyzed soot filter and a selective catalytic reduction catalyst, more preferably a selective catalytic reduction catalyst. It is more preferred that said selective catalytic reduction catalyst comprises one or more of a vanadium oxide and a zeolitic material comprising one or more of Cu and Fe, more preferably comprises a zeolitic material comprising one or more of Cu and Fe.

It is preferred that the sixth catalyst has an inlet end and an outlet end and comprises a coating on a sixth substrate, wherein in the exhaust gas treatment system, the sixth catalyst is located downstream of the fifth catalyst and wherein the inlet end of the sixth catalyst is arranged upstream of the outlet end of the sixth catalyst, wherein the outlet end of the fifth catalyst is in fluid communication with the inlet end of the sixth catalyst and wherein between the outlet end of the fifth catalyst and the inlet end of the sixth catalyst, no catalyst for treating the exhaust gas exiting the fifth catalyst is located in the exhaust gas treatment system.

It is preferred that the system further comprises an injector for injecting a fluid into the exhaust gas stream exiting the internal combustion engine, said injector being located upstream of the sixth catalyst and downstream of the fifth catalyst; wherein the fluid more preferably is an aqueous urea solution.

Alternatively, the fifth catalyst more preferably is a diesel oxidation catalyst and the sixth catalyst more preferably is a catalyzed soot filter.

It is more preferred that the fifth catalyst has an inlet end and an outlet end and comprises a coating on a fifth substrate, more preferably a wall-flow filter substrate, wherein in the exhaust gas treatment system, the fifth catalyst is located downstream of the fourth catalyst and wherein the inlet end of the fifth catalyst is arranged upstream of the outlet end of the fifth catalyst, wherein the outlet end of the fourth catalyst is in fluid communication with the inlet end of the fifth catalyst and wherein between the outlet end of the fourth catalyst and the inlet end of the fifth catalyst, no catalyst for treating the exhaust gas exiting the fourth catalyst is located in the exhaust gas treatment system.

It is more preferred that the sixth catalyst has an inlet end and an outlet end and comprises a coating on a sixth substrate, wherein in the exhaust gas treatment system, the sixth catalyst is located downstream of the fifth catalyst and wherein the inlet end of the sixth catalyst is arranged upstream of the outlet end of the sixth catalyst, wherein the outlet end of the fifth catalyst is in fluid communication with the inlet end of the sixth catalyst and wherein between the outlet end of the fifth catalyst and the inlet end of the sixth catalyst, no catalyst for treating the exhaust gas exiting the fifth catalyst is located in the exhaust gas treatment system.

It is preferred that the system of the present invention further comprises an injector for injecting a fluid into the exhaust gas stream exiting the internal combustion engine, said injector being located upstream of the first catalyst and downstream of the upstream end of the exhaust gas treatment system; wherein the fluid more preferably is an aqueous urea solution.

It is preferred that the system of the present invention further comprises an injector or injectors for injecting a fluid into the exhaust gas stream exiting the internal combustion engine, wherein the injector(s) is(are) located upstream of a selective catalytic reduction catalyst, wherein the fluid more preferably is an aqueous urea solution.

It is preferred that upstream of the first catalyst according to (i) and downstream of the upstream end of the exhaust gas treatment system, no hydrocarbon injector is located.

It is preferred that the system of the present invention consists of the first catalyst according to (i), the hydrocarbon injector according to (ii), the second catalyst according to (iii), and more preferably a third catalyst according to (iv) as defined in the foregoing, and more preferably one or more of a fourth to sixth catalysts as defined in the foregoing.

The present invention further relates to a process for preparing the first catalyst of the exhaust gas treatment system of the present invention, the process comprising
(a) preparing a mixture comprising water, a solution of vanadium oxide, and a first oxidic material comprising titanium;
(b) disposing the mixture obtained in (a) on the surface of the internal walls of a first substrate, wherein the first substrate has an inlet end, an outlet end and a substrate axial length extending from the inlet end to the outlet end of the first substrate and comprises a plurality of passages defined by internal walls, wherein the interface between the passages and the internal walls is defined by the surface of the internal walls, obtaining a slurry-treated substrate;
(c) optionally drying the slurry-treated substrate obtained in (b), obtaining a substrate having a coating disposed thereon;
(d) calcining the slurry-treated substrate obtained in (b), preferably the dried slurry-treated substrate obtained in (c), obtaining a coated substrate; and optionally
(b') disposing the mixture obtained in (a) on the surface of the coating disposed on the substrate as obtained in (d);
(c') optionally drying the slurry-treated substrate obtained in (b');
(d') calcining the slurry-treated substrate obtained in (b'), or the dried slurry-treated substrate obtained in (c');
wherein from (d) or (d'), the first catalyst is obtained.

As to (a), it is preferred that it comprises
(a.1) preparing a mixture comprising water and a first oxidic support comprising titanium, wherein the first oxidic support further comprises one or more of tungsten, silicon, zirconium and antimony, more preferably one or more of tungsten, silicon and antimony;
(a.2) adding a solution of vanadium oxide, more preferably a solution of one or more of vanadium oxalate, ammonium vanadate and vanadium oxide, more preferably vanadium oxalate, to the mixture obtained in (a.1);
(a.3) more preferably adding a source of an oxidic binder, wherein the source of an oxidic binder is one or more of colloidal silica, alumina and zirconia, more preferably colloidal silica.

It is preferred that (b) comprises disposing the mixture over 95 to 100%, more preferably over 98 to 100%, more preferably over 99 to 100% of the substrate axial length.

It is preferred that disposing the mixture according to (b) is performed by spraying the mixture onto the substrate or by immerging the substrate in the mixture, more preferably by immerging the substrate in the mixture.

It is preferred that drying according to (c) is performed in a gas atmosphere having a temperature in the range of from 90 to 200° C., more preferably in the range of from 120 to 160° C.

It is preferred that drying according to (c) is performed in a gas atmosphere for a duration in the range of from 5 to 300 minutes, more preferably in the range of from 20 to 60 minutes.

It is preferred that the dried slurry-treated substrate obtained in (c) has a water content in the range of from 0 to 30%, more preferably in the range of from 5 to 25%, more preferably in the range of from 15 to 20%.

It is preferred that the gas atmosphere comprises, more preferably is, one or more of air, lean air, and oxygen, more preferably air.

It is preferred that calcining according to (d) is performed in a gas atmosphere having a temperature in the range of from 300 to 600° C., more preferably in the range of from 400 to 550° C.

It is preferred that calcining according to (d) is performed in a gas atmosphere for a duration in the range of from 5 to 120 minutes, more preferably in the range of from 20 to 40 minutes.

It is preferred that the gas atmosphere comprises, more preferably is, one or more of air, lean air, and oxygen, more preferably air.

It is preferred that (b') comprises disposing the mixture over 95 to 100%, more preferably over 98 to 100%, more preferably over 99 to 100% of the substrate axial length.

It is preferred that disposing the mixture according to (b') is performed by spraying the mixture onto the substrate or by immerging the substrate in the mixture, more preferably by immerging the substrate in the mixture.

It is preferred that drying according to (c') is performed in a gas atmosphere having a temperature in the range of from 90 to 200° C., more preferably in the range of from 120 to 160° C.

It is preferred that drying according to (c') is performed in a gas atmosphere for a duration in the range of from 5 to 300 minutes, more preferably in the range of from 20 to 60 minutes.

It is preferred that the dried slurry-treated substrate obtained in (c') has a water content in the range of from 0 to 30%, more preferably in the range of from 5 to 25%, more preferably in the range of from 15 to 20%.

It is preferred that the gas atmosphere comprises, more preferably is, one or more of air, lean air, and oxygen, more preferably air.

It is preferred that calcining according to (d') is performed in a gas atmosphere having a temperature in the range of from 300 to 600° C., more preferably in the range of from 400 to 550° C.

It is preferred that calcining according to (d') is performed in a gas atmosphere for a duration in the range of from 5 to 120 minutes, more preferably in the range of from 20 to 40 minutes.

It is preferred that the gas atmosphere comprises, more preferably is, one or more of air, lean air, and oxygen, more preferably air.

It is preferred that the process consists of (a), (b), (c), (d) and optionally (b'), (c') and (d').

The present invention further relates to a catalyst, more preferably the first catalyst according to (i) in the exhaust gas treatment system of the present invention, obtained or obtainable by a process according to the present invention.

The present invention further relates to the use of the catalyst of the present invention for the selective catalytic reduction of NOx.

The present invention further relates to the use of an exhaust gas treatment system according to the present invention for treating an exhaust gas stream leaving an internal combustion engine, preferably leaving a diesel engine.

The present invention further relates to a method for treating an exhaust gas stream leaving an internal combustion engine, the method comprising
(1) providing an exhaust gas stream from an internal combustion engine, preferably from a diesel engine, the exhaust gas stream comprising one or more of NOx, ammonia, nitrogen monoxide and a hydrocarbon;
(2) passing the exhaust gas stream provided in (1) through the exhaust gas system according to the present invention.

The present invention is illustrated by the following set of embodiments and combinations of embodiments resulting from the dependencies and back-references as indicated. In particular, it is noted that in each instance where a range of embodiments is mentioned, for example in the context of a term such as "The system of any one of embodiments 1 to 4", every embodiment in this range is meant to be explicitly disclosed for the skilled person, i.e. the wording of this term is to be understood by the skilled person as being synonymous to "The system of any one of embodiments 1, 2, 3 and 4". Further, it is explicitly noted that the following set of embodiments is not the set of claims determining the extent of protection, but represents a suitably structured part of the description directed to general and preferred aspects of the present invention.

1. An exhaust gas treatment system for treating an exhaust gas stream leaving an internal combustion engine, said exhaust gas treatment system having an upstream end for introducing said exhaust gas stream into said exhaust gas treatment system, wherein said exhaust gas treatment system comprises
    (i) a first catalyst having an inlet end and an outlet end and comprising a coating and a first substrate, wherein the first substrate has an inlet end, an outlet end and a substrate axial length extending from the inlet end to the outlet end of the first substrate and comprises a plurality of passages defined by internal walls, wherein the interface between the passages and the internal walls is defined by the surface of the internal walls, wherein the coating is disposed on the surface of the internal walls of the first substrate and the coating comprises a vanadium oxide supported on a first oxidic support comprising titanium;
    (ii) a hydrocarbon injector for injecting a fluid comprising hydrocarbons into the exhaust gas stream exiting the outlet end of the first catalyst according to (i);
    (iii) a second catalyst having an inlet end and an outlet end and comprising a coating and a second substrate, wherein the second substrate has an inlet end, an outlet end and a substrate axial length extending from the inlet end to the outlet end of the second substrate and comprises a plurality of passages defined by internal walls, wherein the interface between the passages and the internal walls is defined by the surface of the internal walls, wherein the coating is disposed on the surface of the internal walls of the second substrate and the coating comprises palladium on a second oxidic support comprising one or more of zirconium, silicon, aluminum and titanium;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (iii) is located downstream of the first catalyst according to (i) and downstream of the hydrocarbon injector according to (ii) and wherein the inlet end of the second catalyst is arranged upstream of the outlet end of the second catalyst.

2. The system of embodiment 1, wherein the outlet end of the first catalyst according to (i) is in fluid communication with the inlet end of the second catalyst according to (iii) and wherein between the outlet end of the first catalyst according to (i) and the inlet end of the second catalyst according to (iii), no catalyst for treating the exhaust gas stream exiting the first catalyst is located in the exhaust gas treatment system.

3. The system of embodiment 1 or 2, wherein the first catalyst comprises a nitrogen oxide (NOx) reduction component.

4. The system of any one of embodiments 1 to 3, wherein the vanadium oxide comprised in the first catalyst is one or more of a vanadium (V) oxide, a vanadium (IV) oxide and a vanadium (III) oxide.

5. The system of any one of embodiments 1 to 4, wherein the coating of the first catalyst comprises the vanadium oxide at an amount in the range of from 1.0 to 10 weight-%, preferably in the range of from 2.0 to 8.0 weight-%, more preferably in the range of from 2.5 to 6.0 weight-%, based on the weight of the first oxidic support.

6. The system of any one of embodiments 1 to 5, wherein the first oxidic support comprising titanium further comprises one or more of tungsten, silicon, zirconium and antimony, preferably one or more of tungsten, silicon and antimony;

wherein the first oxidic support preferably further comprises tungsten and silicon or the first oxidic support preferably further comprises antimony and silicon.

7. The system of any one of embodiments 1 to 6, wherein from 80 to 98 weight-%, preferably from 85 to 95 weight-%, of the first oxidic support consist of titania, wherein preferably from 2 to 10 weight-%, more preferably from 5 to 15 weight-%, of the first oxidic support consist of tungsten and silicon or of antimony and silicon, calculated as $WO_3$ and $SiO_2$ or as $Sb_2O_3$ and $SiO_2$ respectively.

8. The system of any one of embodiments 1 to 7, wherein the coating of the first catalyst comprises the first oxidic support at a loading in the range of from 1 to 10 $g/in^3$, preferably in the range of from 2 to 7 $g/in^3$, more preferably in the range of from 3 to 5.5 $g/in^3$.

9. The system of any one of embodiments 1 to 8, wherein the coating of the first catalyst further comprises an oxidic binder, wherein the oxidic binder preferably is selected from the group consisting of alumina, silica, zirconia, and mixture of two or more thereof, more preferably selected from the group consisting of alumina, silica and mixture of two or more thereof, more preferably silica;

wherein the coating of the first catalyst preferably comprises the oxidic binder at an amount in the range of from 0.5 to 10 weight-%, more preferably in the range of from 2 to 8 weight-%, more preferably in the range of from 3 to 6 weight-%, based on the weight of the first oxidic support.

10. The system of any one of embodiments 1 to 9, wherein from 95 to 100 weight-%, preferably from 98 to 100 weight-%, more preferably from 99 to 100 weight-%, more preferably from 99.5 to 100 weight-%, of the coating of the first catalyst consist of a vanadium oxide supported on a first oxidic support comprising titanium, preferably titania, wherein more preferably the first oxidic support further comprises tungsten and silicon, and preferably an oxidic binder as defined in embodiment 9.

11. The system of any one of embodiments 1 to 10, wherein at most 0.001 weight-%, preferably from 0 to 0.001 weight-%, more preferably from 0 to 0.0001 weight-%, more preferably from 0 to 0.00001 weight-% of the coating of the first catalyst consist of palladium, preferably of palladium and rhodium, more preferably of palladium, platinum and rhodium, more preferably of platinum group metals.

12. The system of any one of embodiments 1 to 11, wherein at most 0.1 weight-%, preferably from 0 to 0.1 weight-%, more preferably from 0 to 0.01 weight-%, more preferably from 0 to 0.001 weight-% of the coating of the first catalyst consist of a zeolitic material, preferably of a molecular sieve.

13. The system of any one of embodiments 1 to 12, wherein the first substrate comprises, preferably consist of, one or more of a cordierite, an aluminum titanate and a silicon carbide, preferably one or more of a cordierite and a silicon carbide, more preferably a cordierite;

wherein the first substrate preferably is a wall-flow filter substrate or a flow-through substrate, more preferably a flow-though substrate, more preferably a cordierite flow-through substrate; or wherein the first substrate comprises, preferably consist of, a metallic substance, wherein the metallic substance preferably comprises, more preferably consists of, oxygen and one or more of iron, chromium and aluminum;

wherein the first substrate preferably is a wall-flow filter substrate or a flow-through substrate, more preferably a flow-though substrate, more preferably a metallic flow-through substrate.

14. The system of any one of embodiments 1 to 13, wherein the first catalyst comprises the coating at a loading in the range of from 1.5 to 12 $g/in^3$, preferably in the range of from 2.5 to 8 $g/in^3$, more preferably in the range of from 3.5 to 6 $g/in^3$;

wherein the coating of the first catalyst preferably extends over 95 to 100%, more preferably over 98 to 100%, more preferably over 99 to 100%, of the first substrate axial length.

15. The system of any one of embodiments 1 to 14, wherein the first catalyst according to (i) consists of the coating and the first substrate.

16. The system of any one of embodiments 1 to 15, wherein the second oxidic support comprised in the coating of the second catalyst according to (iii) comprises one or more of zirconium and aluminum, preferably aluminum, and optionally zirconium;

wherein more preferably from 90 to 100 weight-%, more preferably from 95 to 100 weight-%, more preferably from 98 to 100 weight-%, more preferably from 99 to 100 weight-%, of the second oxidic support consist of aluminum, oxygen and optionally zirconium;
wherein preferably from 60 to 95 weight-%, more preferably from 75 to 85 weight-%, of the second oxidic support consist of alumina and more preferably from 5 to 40 weight-%, more preferably from 15 to 25 weight-%, of the second oxidic support consist of zirconia.

17. The system of any one of embodiments 1 to 16, wherein the coating of the second catalyst according to (iii) comprises the second oxidic support at a loading in the range of from 0.25 to 5 g/in$^3$, preferably in the range of from 0.5 to 5 g/in$^3$, more preferably in the range of from 0.75 to 4 g/in$^3$, more preferably in the range of from 1 to 2 g/in$^3$.

18. The system of any one of embodiments 1 to 17, wherein the coating of the second catalyst according to (iii) comprises palladium at an amount in the range of from 5 to 90 g/ft$^3$, preferably in the range of from 10 to 70 g/ft$^3$, more preferably in the range of from 30 to 60 g/ft$^3$.

19. The system of any one of embodiments 1 to 18, wherein palladium is the only platinum group metal present in the coating of the second catalyst according to (iii).

20. The system of any one of embodiments 1 to 19, wherein the second substrate comprises, preferably consist of, one or more of a cordierite, an aluminum titanate and a silicon carbide, preferably one or more of a cordierite and a silicon carbide, more preferably a cordierite;
wherein the second substrate preferably is a wall-flow filter substrate or a flow-through substrate, more preferably a flow-though substrate, more preferably a cordierite flow-through substrate; or
wherein the second substrate comprises, preferably consist of, a metallic substance, wherein the metallic substance preferably comprises, more preferably consists of, oxygen and one or more of iron, chromium and aluminum;
wherein the second substrate preferably is a wall-flow filter substrate or a flow-through substrate, more preferably a flow-though substrate, more preferably a metallic flow-through substrate.

21. The system of any one of embodiments 1 to 20, wherein the second catalyst according to (iii) consists of the coating and the second substrate.

22. The system of any one of embodiments 1 to 21, wherein at most 0.1 weight-%, preferably from 0 to 0.1 weight-%, more preferably from 0 to 0.01 weight-%, more preferably from 0 to 0.001 weight-% of the coating of the second catalyst consist of a vanadium oxide.

23. The system of any one of embodiments 1 to 22, wherein from 98 to 100 weight-%, preferably from 99 to 100 weight-%, more preferably from 99.5 to 100 weight-%, of the coating of the second catalyst consist of palladium supported on the second oxidic support comprising one or more of zirconium, silicon, aluminum and titanium, preferably aluminum and zirconium.

24. The system of any one of embodiments 1 to 22, wherein the coating of the second catalyst according to (iii) further comprises a zeolitic material, the zeolitic material comprising one or more of Cu and Fe.

25. The system of embodiment 24, wherein the zeolitic material comprised in the coating of the second catalyst has a framework type AEI, GME, CHA, MFI, BEA, FAU, MOR or mixtures of two or more thereof, preferably a framework type AEI, CHA, BEA or mixtures of two or more thereof, more preferably a framework type CHA or AEI, more preferably a framework type CHA.

26. The system of embodiment 24 or 25, wherein the zeolitic material comprised in the coating of the second catalyst comprises copper, wherein the amount of copper comprised in the zeolitic material, calculated as CuO, preferably is in the range of from 0.5 to 10 weight-%, more preferably in the range of from 1 to 7 weight-%, more preferable in the range of from 2.5 to 6 weight-%, based on the total weight of the zeolitic material;
wherein the amount of iron in the zeolitic material, calculated as Fe$_2$O$_3$, more preferably is in the range of from 0 to 0.01 weight-%, more preferably from 0 to 0.001 weight-%, more preferably from 0 to 0.0001 weight-%, based on the total weight of the zeolitic material.

27. The system of any one of embodiments 24 to 26, wherein from 95 to 100 weight-%, preferably from 98 to 100 weight-%, more preferably from 99 to 100 weight-%, more preferably from 99.5 to 100 weight-%, of the framework structure of the zeolitic material comprised in the coating of the second catalyst consist of Si, Al, O and H, wherein in the framework structure, the molar ratio of Si to Al, calculated as molar SiO$_2$:Al$_2$O$_3$, preferably is in the range of from 2:1 to 50:1, more preferably in the range of from 4:1 to 45:1, more preferably in the range of from 10:1 to 40:1, more preferably in the range of from 15:1 to 35:1.

28. The system of embodiment 24 or 25, wherein the zeolitic material comprised in the coating of the second catalyst comprises iron, wherein the amount of iron comprised in the zeolitic material, calculated as Fe$_2$O$_3$, preferably is in the range of from 0.1 to 10.0 weight-%, more preferably in the range of from 1.0 to 7.0 weight-%, more preferably in the range of from 2.5 to 5.5 weight-% based on the total weight of the zeolitic material, and wherein preferably from 95 to 100 weight-%, more preferably from 98 to 100 weight-%, more preferably from 99 to 100 weight-%, more preferably from 99.5 to 100 weight-%, of the framework structure of the zeolitic material consist of Si, Al, O and H, wherein in the framework structure, the molar ratio of Si to Al, calculated as molar SiO$_2$:Al$_2$O$_3$, preferably is in the range of from 2:1 to 50:1, more preferably in the range of from 4:1 to 45:1, more preferably in the range of from 10:1 to 40:1, more preferably in the range of from 15:1 to 35:1.

29. The system of any one of embodiments 24 to 28, wherein the zeolitic material comprised in the coating of the second catalyst, preferably which has a framework type CHA, has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscope.

30. The system of any one of embodiments 24 to 29, wherein the coating of the second catalyst comprises the zeolitic material at a loading in the range of from 0.2 to 8 g/in$^3$, preferably in the range of from 0.5 to 6 g/in$^3$, more preferably in the range of from 1 to 4 g/in$^3$, wherein the coating of the second catalyst according to (iii) preferably comprises the second oxidic support at a loading in the range of from 0.3 to 0.75 g/in$^3$, more preferably in the range of from 0.4 to 0.6 g/in$^3$.

31. The system of any one of embodiments 24 to 30, wherein the coating of the second catalyst according to (iv) further comprises an oxidic binder, wherein the oxidic binder preferably is selected from the group consisting of alumina, silica, zirconia, and mixture of two or more thereof, more preferably selected from the group consisting of alumina, zirconia and mixture of two or more thereof, more preferably zirconia;
wherein the coating of the second catalyst preferably comprises the oxidic binder at an amount in the range of from 0.5 to 10 weight-%, preferably in the range of from 2 to 8 weight-%, more preferably in the range of from 3 to 6 weight-%, based on the total weight of the zeolitic material.

32. The system of any one of embodiments 24 to 31, wherein from 95 to 100 weight-%, preferably from 98 to 100 weight-%, more preferably from 99 to 100 weight-%, more preferably from 99.5 to 100 weight-%, of the coating of the second catalyst consist of palladium on the second oxidic support comprising one or more of zirconium, silicon, aluminum and titanium, a zeolitic material comprising one or more of Cu and Fe, and preferably an oxidic binder as defined in embodiment 31.

33. The system of any one of embodiments 1 to 32, wherein the second catalyst comprises the coating at a loading in the range of from 0.3 to 5 g/in$^3$, preferably in the range of from 1 to 4 g/in$^3$, more preferably in the range of from 1.5 to 4.6 g/in$^3$;
wherein the coating of the second catalyst preferably extends over 95 to 100%, more preferably over 98 to 100%, more preferably over 99 to 100%, of the second substrate axial length.

34. The system of any one of embodiments 1 to 33, further comprising
(iv) a third catalyst having an inlet end and an outlet end and comprising a coating and a third substrate, wherein the third substrate has an inlet end, an outlet end and a substrate axial length extending from the inlet end to the outlet end of the third substrate and comprises a plurality of passages defined by internal walls, wherein the interface between the passages and the internal walls is defined by the surface of the internal walls, wherein the coating is disposed on the surface of the internal walls of the third substrate and the coating comprises one or more of a vanadium oxide and a zeolitic material comprising one or more of Cu and Fe;
wherein in the exhaust gas treatment system, the third catalyst according to (iv) is located downstream of the second catalyst according to (iii) and wherein the inlet end of the third catalyst is arranged upstream of the outlet end of the third catalyst.

35. The system of embodiment 34, wherein the outlet end of the second catalyst according to (iii) is in fluid communication with the inlet end of the third catalyst according to (iv) and wherein between the outlet end of the second catalyst according to (iii) and the inlet end of the third catalyst according to (iv), no catalyst for treating the exhaust gas stream exiting the second catalyst is located in the exhaust gas treatment system.

36. The system of embodiment 34 or 35, wherein the coating of the third catalyst according to (iv) comprises a zeolitic material comprising one or more of Cu and Fe.

37. The system of embodiment 36, wherein the zeolitic material comprised in the coating of the third catalyst has a framework type AEI, GME, CHA, MFI, BEA, FAU, MOR or mixtures of two or more thereof, preferably a framework type AEI, CHA, BEA or mixtures of two or more thereof, more preferably a framework type CHA or AEI, more preferably a framework type CHA.

38. The system of embodiment 36 or 37, wherein the zeolitic material comprised in the coating of the third catalyst comprises copper, wherein the amount of copper comprised in the zeolitic material, calculated as CuO, preferably is in the range of from 0.5 to 10 weight-%, more preferably from 1 to 8 weight-%, more preferably from 2 to 7 weight-%, more preferable from 3 to 6 weight-%, based on the total weight of the zeolitic material;
wherein the amount of iron in the zeolitic material, calculated as Fe$_2$O$_3$, more preferably is in the range of from 0 to 0.01 weight-%, more preferably from 0 to 0.001 weight-%, more preferably from 0 to 0.0001 weight-%, based on the total weight of the zeolitic material.

39. The system of any one of embodiments 36 to 38, wherein from 95 to 100 weight-%, preferably from 98 to 100 weight-%, more preferably from 99 to 100 weight-%, more preferably from 99.5 to 100 weight-%, of the framework structure of the zeolitic material comprised in the coating of the third catalyst consist of Si, Al, O and H, wherein in the framework structure, the molar ratio of Si to Al, calculated as molar SiO$_2$:Al$_2$O$_3$, preferably is in the range of from 2:1 to 50:1, more preferably in the range of from 4:1 to 45:1, more preferably in the range of from 10:1 to 40:1, more preferably in the range of from 15:1 to 35:1.

40. The system of embodiment 36 or 37, wherein the zeolitic material comprised in the coating of the third catalyst comprises iron, wherein the amount of iron comprised in the zeolitic material, calculated as Fe$_2$O$_3$, preferably is in the range of from 0.1 to 10.0 weight-%, more preferably in the range of from 1.0 to 7.0 weight-%, more preferably in the range of from 2.5 to 5.5 weight-% based on the total weight of the zeolitic material, and wherein preferably from 95 to 100 weight-%, more preferably from 98 to 100 weight-%, more preferably from 99 to 100 weight-%, more preferably from 99.5 to 100 weight-%, of the framework structure of the zeolitic material consist of Si, Al, O and H, wherein in the framework structure, the molar ratio of Si to Al, calculated as molar SiO$_2$: Al$_2$O$_3$, preferably is in the range of from 2:1 to 50:1, more preferably in the range of from 4:1 to 45:1, more preferably in the range of from 10:1 to 40:1, more preferably in the range of from 15:1 to 35:1.

41. The system of any one of embodiments 36 to 40, wherein the zeolitic material comprised in the coating of the third catalyst, preferably which has a framework type CHA, has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscope.

42. The system of any one of embodiments 36 to 41, wherein the coating of the third catalyst comprises the zeolitic material at a loading in the range of from 0.5 to 8 g/in³, preferably in the range of from 0.75 to 5 g/in³, more preferably in the range of from 1 to 3.5 g/in³.

43. The system of any one of embodiments 36 to 42, wherein the coating of the third catalyst according to (iv) further comprises an oxidic binder, wherein the oxidic binder preferably is selected from the group consisting of alumina, silica, zirconia, and mixture of two or more thereof, more preferably selected from the group consisting of alumina, zirconia and mixture of two or more thereof, more preferably zirconia.

44. The system of embodiment 42, wherein the coating of the third catalyst comprises the oxidic binder at an amount in the range of from 0.5 to 10 weight-%, preferably in the range of from 2 to 8 weight-%, more preferably in the range of from 3 to 6 weight-%, based on the total weight of the zeolitic material.

45. The system of any one of embodiments 36 to 44, wherein at most 0.001 weight-%, preferably from 0 to 0.001 weight-%, more preferably from 0 to 0.0001 weight-%, more preferably from 0 to 0.00001 weight-% of the coating of the third catalyst consist of palladium, platinum and rhodium, preferably of platinum group metals.

46. The system of any one of embodiments 36 to 45, wherein at most 0.1 weight-%, preferably from 0 to 0.1 weight-%, more preferably from 0 to 0.01 weight-%, more preferably from 0 to 0.001 weight-% of the coating of the third catalyst consist of a vanadium oxide.

47. The system of any one of embodiments 36 to 46, wherein from 95 to 100 weight-%, preferably from 98 to 100 weight-%, more preferably from 99 to 100 weight-%, more preferably from 99.5 to 100 weight-%, of the coating of the third catalyst consist of a zeolitic material comprising one or more of Cu and Fe, and preferably an oxidic binder as in embodiment 43 or 44.

48. The system of any one of embodiments 36 to 47, wherein the coating of the second catalyst according to (iii) comprises, preferably consists of, palladium supported on the second oxidic support comprising one or more of zirconium, silicon, aluminum and titanium, preferably aluminum and optionally zirconium, and wherein the coating of the third catalyst according to (iv) comprises, preferably consists of, a zeolitic material comprising one or more of Cu and Fe, and preferably an oxidic binder as in embodiment 43 or 44.

49. The system of embodiment 34 or 35, wherein the coating of the third catalyst comprises a vanadium oxide, wherein the vanadium oxide is one or more of a vanadium (V) oxide, a vanadium (IV) oxide and a vanadium (III) oxide.

50. The system of embodiment 49, wherein the vanadium is supported on a third oxidic support, wherein the coating of the third catalyst preferably comprises the vanadium oxide at an amount in the range of from 1.5 to 10 weight-%, more preferably in the range of from 2.5 to 8 weight-%, more preferably in the range of from 3 to 6 weight-%, based on the weight of the third oxidic support.

51. The system of embodiment 49 or 50, wherein the third oxidic support comprises titanium, wherein the third oxidic support further comprises one or more of tungsten, silicon, zirconium and antimony, preferably one or more of tungsten, silicon and antimony.

52. The system of embodiment 51, wherein the third oxidic support further comprises tungsten and silicon or the third oxidic support further comprises antimony and silicon.

53. The system of any one of embodiments 50 to 53, wherein from 80 to 98 weight-%, more preferably from 85 to 95 weight-%, of the third oxidic support consist of titania, and wherein preferably from 2 to 10 weight-%, more preferably from 5 to 15 weight-%, of the third oxidic support consist of tungsten and silicon, or antimony and silicon, calculated as $WO_3$ and $SiO_2$ or as $Sb_2O_3$ and $SiO_2$ respectively.

54. The system of any one of embodiments 50 to 53, wherein the coating of the third catalyst comprises the third oxidic support at a loading in the range of from 1 to 10 g/in³, preferably in the range of from 2 to 7 g/in³, more preferably in the range of from 3 to 5.5 g/in³.

55. The system of any one of embodiments 50 to 54, wherein the coating of the third catalyst further comprises an oxidic binder, wherein the oxidic binder preferably is selected from the group consisting of alumina, silica, zirconia, and mixture of two or more thereof, more preferably selected from the group consisting of alumina, silica and mixture of two or more thereof, more preferably silica;
wherein the coating comprises the oxidic binder at an amount in the range of from 0.5 to 10 weight-%, preferably in the range of from 2 to 8 weight-%, more preferably in the range of from 3 to 6 weight-%, based on the weight of the third oxidic support.

56. The system of any one of embodiments 36 to 44 and 49 to 55, wherein the coating of the third catalyst further comprises a platinum group metal component, wherein the platinum group metal component is one or more of palladium, platinum and rhodium, preferably one or more of palladium and platinum.

57. The system of embodiment 56, wherein the platinum group metal component is platinum and palladium, wherein the weight ratio of platinum relative to palladium, calculated as elemental platinum group metal, Pt:Pd, preferably is in the range of from 2:1 to 18:1, more preferably in the range of from 5:1 to 15:1, more preferably in the range of from 8:1 to 12:1.

58. The system of embodiment 56 or 57, wherein the coating of the third catalyst comprises the platinum group metal component at a loading in the range of from 1 to 30 g/ft³, preferably in the range of from 2 to 15 g/ft³, more preferably in the range of from 5 to 12 g/ft³.

59. The system of any one of embodiments 56 to 58, wherein the platinum group metal component is supported on an oxidic material, wherein the oxidic material preferably is one of more of alumina, silica, zirconia and titania, more preferably is one or more of alumina, silica and zirconia, more preferably is one or more of alumina and silica, wherein the oxidic material more preferably is alumina doped with zirconia.

60. The system of embodiment 59, wherein the coating of the third catalyst comprises the oxidic material supporting the platinum group metal component at a loading in the range of from 0.1 to 4 g/in³, preferably in the range of from 0.2 to 2 g/in³, more preferably in the range of from 0.5 to 1.5 g/in³.

61. The system of any one of embodiments 56 to 60, wherein from 95 to 100 weight-%, preferably from 98 to 100 weight-%, more preferably from 99 to 100 weight-%, more preferably from 99.5 to 100 weight-%, of the coating of the third catalyst consist of a platinum group component, preferably supported on an oxidic material as defined in embodiment 59 or 60, and a vanadium oxide supported on a third oxidic support, and preferably an oxidic binder as defined in embodiment 55.

62. The system of any one of embodiments 56 to 60, wherein from 95 to 100 weight-%, preferably from 98 to 100 weight-%, more preferably from 99 to 100 weight-%, more preferably from 99.5 to 100 weight-%, of the coating of the third catalyst consist of a platinum group component, preferably supported on an oxidic material as defined in embodiment 59 or 60, and a zeolitic material comprising one or more of Cu and Fe, and preferably an oxidic binder as in embodiment 43 or 44.

63. The system of any one of embodiments 34 to 62, wherein the third substrate comprises, preferably consist of, one or more of a cordierite, an aluminum titanate and a silicon carbide, preferably one or more of a cordierite and a silicon carbide, more preferably a cordierite;
wherein the third substrate preferably is a wall-flow filter substrate or a flow-through substrate, more preferably a flow-though substrate, more preferably a cordierite flow-through substrate.

64. The system of any one of embodiments 34 to 63, wherein the third catalyst comprises the coating at a loading in the range of from 0.75 to 10 g/in$^3$, preferably in the range of from 1 to 7 g/in$^3$, more preferably in the range of from 1.5 to 5.5 g/in$^3$;
wherein the coating of the third catalyst preferably extends over 95 to 100%, more preferably over 98 to 100%, more preferably over 99 to 100%, of the third substrate axial length.

65. The system of any one of embodiments 34 to 64, wherein the third substrate of the third catalyst has a substrate length in the range of from 2.54 to 25.4 cm (1 to 10 inches), preferably in the range of from 3.81 to 17.78 cm (1.5 to 7 inches), more preferably in the range of from 5.08 to 10.16 cm (2 to 4 inches).

66. The system of any one of embodiments 34 to 65, wherein the third substrate of the third catalyst has a substrate width in the range of from 10.16 to 43.18 cm (4 to 17 inches), preferably in the range of from 17.78 to 38.10 cm (7 to 15 inches), more preferably in the range of from 22.86 to 30.48 cm (9 to 12 inches).

67. The system of any one of embodiments 34 to 66, wherein the third catalyst according to (iv) consists of the coating and the third substrate.

68. The system of any one of embodiments 1 to 67, wherein the first substrate of the first catalyst has a substrate length in the range of from 2.54 to 25.4 cm (1 to 10 inches), preferably in the range of from 5.08 to 20.32 cm (2 to 8 inches), more preferably in the range of from 7.62 to 15.24 cm (3 to 6 inches).

69. The system of any one of embodiments 1 to 68, wherein the first substrate of the first catalyst has a substrate width in the range of from 2.54 to 50.8 cm (1 to 20 inches), preferably in the range of from 12.7 to 43.18 cm (5 to 17 inches), more preferably in the range of from 20.32 to 38.1 cm (8 to 15 inches).

70. The system of any one of embodiments 34 to 64, wherein the second substrate of the second catalyst has a substrate length in the range of from 2.54 to 25.4 cm (1 to 10 inches), preferably in the range of from 3.81 to 17.78 cm (1.5 to 7 inches), more preferably in the range of from 5.08 to 10.16 cm (2 to 4 inches).

71. The system of any one of embodiments 34 to 65, wherein the second substrate of the second catalyst has a substrate width in the range of from 10.16 to 50.8 cm (4 to 20 inches), preferably in the range of from 17.78 to 43.18 cm (7 to 17 inches), more preferably in the range of from 22.86 to 38.1 cm (9 to 15 inches).

72. The system of any one of embodiments 34 to 71, further comprising a fourth catalyst, wherein the fourth catalyst is one or more of an ammonia oxidation catalyst, a catalyzed soot filter and a selective catalytic reduction catalyst.

73. The system of embodiment 72, wherein the fourth catalyst is an ammonia oxidation catalyst, wherein the fourth catalyst has an inlet end and an outlet end and comprises a coating and a fourth substrate, wherein the fourth substrate has an inlet end, an outlet end and a substrate axial length extending from the inlet end to the outlet end of the fourth substrate and comprises a plurality of passages defined by internal walls, wherein the interface between the passages and the internal walls is defined by the surface of the internal walls, wherein the coating is disposed on the surface of the internal walls of the fourth substrate and the coating comprises an ammonia oxidation component,
wherein in the exhaust gas treatment system, the fourth catalyst is located downstream of the third catalyst according to (iv) and wherein the inlet end of the fourth catalyst is arranged upstream of the outlet end of the fourth catalyst;
wherein the outlet end of the third catalyst according to (iv) is in fluid communication with the inlet end of the fourth catalyst and wherein between the outlet end of the third catalyst and the inlet end of the fourth catalyst, no catalyst for treating the exhaust gas exiting the third catalyst is located in the exhaust gas treatment system.

74. The system of embodiment 73, wherein the ammonia oxidation component of the coating of the fourth catalyst comprises a platinum group metal component and one or more of a vanadium oxide and a zeolitic material comprising one or more of Cu and Fe, preferably a platinum group metal component and a zeolitic material comprising one or more of Cu and Fe.

75. The system of embodiment 74, wherein the ammonia oxidation component of the coating of the fourth catalyst comprises, preferably consists of, a platinum group metal component, preferably one or more of palladium and platinum, supported on an oxidic support and a zeolitic material, preferably having a framework type CHA, comprising Cu.

76. The system of any one of embodiments 72 to 75, further comprising a fifth catalyst, wherein the fifth catalyst is one or more of an ammonia oxidation catalyst, a diesel oxidation catalyst, a catalyzed soot filter and a selective catalytic reduction catalyst, preferably a catalyzed soot filter.

77. The system of embodiment 76, wherein the fifth catalyst has an inlet end and an outlet end and comprises a coating on a fifth substrate, preferably a wall-flow filter substrate, wherein in the exhaust gas treatment system, the fifth catalyst is located downstream of the fourth catalyst and wherein the inlet end of the fifth catalyst is arranged upstream of the outlet end of the fifth catalyst, wherein the outlet end of the fourth catalyst is in fluid communication with the inlet end of the fifth catalyst and wherein between the outlet end of the fourth catalyst and the inlet end of the fifth catalyst, no catalyst for treating the exhaust gas exiting the fourth catalyst is located in the exhaust gas treatment system.

78. The system of embodiment 76 or 77, further comprising a sixth catalyst, wherein the sixth catalyst is one or more of an ammonia oxidation catalyst, a catalyzed soot filter and a selective catalytic reduction catalyst, preferably a selective catalytic reduction catalyst;
wherein the selective catalytic reduction catalyst preferably comprises one or more of a vanadium oxide and a zeolitic material comprising one or more of Cu and Fe, more preferably comprises a zeolitic material comprising one or more of Cu and Fe.

79. The system of embodiment 78, wherein the sixth catalyst has an inlet end and an outlet end and comprises a coating on a sixth substrate, wherein in the exhaust gas treatment system, the sixth catalyst is located downstream of the fifth catalyst and wherein the inlet end of the sixth catalyst is arranged upstream of the outlet end of the sixth catalyst, wherein the outlet end of the fifth catalyst is in fluid communication with the inlet end of the sixth catalyst and wherein between the outlet end of the fifth catalyst and the inlet end of the sixth catalyst, no catalyst for treating the exhaust gas exiting the fifth catalyst is located in the exhaust gas treatment system.

80. The system of embodiment 78 or 79, further comprising an injector for injecting a fluid into the exhaust gas stream exiting the internal combustion engine, said injector being located upstream of the sixth catalyst and downstream of the fifth catalyst; wherein the fluid preferably is an aqueous urea solution.

81. The system of any one of embodiments 1 to 80, further comprising an injector for injecting a fluid into the exhaust gas stream exiting the internal combustion engine, said injector being located upstream of the first catalyst and downstream of the upstream end of the exhaust gas treatment system;
wherein the fluid preferably is an aqueous urea solution;
wherein upstream of the first catalyst and downstream of the upstream end of the exhaust gas treatment system, no hydrocarbon injector is located.

82. The system of any one of embodiments 1 to 81, consisting of the first catalyst according to (i), the hydrocarbon injector according to (ii), the second catalyst according to (iii), and preferably a third catalyst according to (iv) as defined in any one of embodiments 34 to 67, and more preferably one or more of a fourth to sixth catalysts as defined in any one of embodiments 72 to 79, and more preferably an injector or injectors as defined in embodiment 80 or 81.

83. A process for preparing the first catalyst of the exhaust gas treatment system according to any one of embodiments 1 to 82, the process comprising
(a) preparing a mixture comprising water, a solution of vanadium oxide, and a first oxidic material comprising titanium;
(b) disposing the mixture obtained in (a) on the surface of the internal walls of a first substrate, wherein the first substrate has an inlet end, an outlet end and a substrate axial length extending from the inlet end to the outlet end of the first substrate and comprises a plurality of passages defined by internal walls, wherein the interface between the passages and the internal walls is defined by the surface of the internal walls, obtaining a slurry-treated substrate;
(c) optionally drying the slurry-treated substrate obtained in (b), obtaining a substrate having a coating disposed thereon;
(d) calcining the slurry-treated substrate obtained in (b), preferably the dried slurry-treated substrate obtained in (c), obtaining a coated substrate;
and optionally
(b') disposing the mixture obtained in (a) on the surface of the coating disposed on the substrate as obtained in (d);
(c') optionally drying the slurry-treated substrate obtained in (b'); (d') calcining the slurry-treated substrate obtained in (b'), or the dried slurry-treated substrate obtained in (c');
wherein from (d) or (d'), the first catalyst is obtained.

84. The process of embodiment 83, wherein (a) comprises
(a.1) preparing a mixture comprising water and a first oxidic support comprising titanium, wherein the first oxidic support further comprises one or more of tungsten, silicon, zirconium and antimony, preferably one or more of tungsten, silicon and antimony;
(a.2) adding a solution of vanadium oxide, preferably a solution of one or more of vanadium oxalate, ammonium vanadate and vanadium oxide, more preferably vanadium oxalate, to the mixture obtained in (a.1);
(a.3) preferably adding a source of an oxidic binder, wherein the source of an oxidic binder is one or more of colloidal silica, alumina and zirconia, more preferably colloidal silica.

85. The process of embodiment 83 or 84, wherein (b) comprises disposing the mixture over 95 to 100%, preferably over 98 to 100%, more preferably over 99 to 100% of the substrate axial length.

86. The process of any one of embodiments 83 to 85, wherein disposing the mixture according to (b) is performed by spraying the mixture onto the substrate or by immerging the substrate in the mixture, preferably by immerging the substrate in the mixture.

87. The process of any one of embodiments 83 to 86, wherein drying according to (c) is performed in a gas atmosphere having a temperature in the range of from 90 to 200° C., preferably in the range of from 120 to 160° C.

88. The process of any one of embodiments 83 to 87, wherein drying according to (c) is performed in a gas atmosphere for a duration in the range of from 5 to 300 minutes, preferably in the range of from 20 to 60 minutes.

89. The process of any one of embodiments 83 to 88, wherein the dried slurry-treated substrate obtained in (c) has a water content in the range of from 0 to 30%, preferably in the range of from 5 to 25%, more preferably in the range of from 15 to 20%.

90. The process of any one of embodiments 87 to 89, wherein the gas atmosphere comprises, preferably is, one or more of air, lean air, and oxygen, more preferably air.

91. The process of any one of embodiments 83 to 90, wherein calcining according to (d) is performed in a gas atmosphere having a temperature in the range of from 300 to 600° C., preferably in the range of from 400 to 550° C.

92. The process of any one of embodiments 83 to 91, wherein calcining according to (d) is performed in a gas atmosphere for a duration in the range of from 5 to 120 minutes, preferably in the range of from 20 to 40 minutes.
93. The process of embodiment 91 or 92, wherein the gas atmosphere comprises, preferably is, one or more of air, lean air, and oxygen, more preferably air.
94. The process of any one of embodiments 83 to 93, wherein (b') comprises disposing the mixture over 95 to 100%, preferably over 98 to 100%, more preferably over 99 to 100% of the substrate axial length.
95. The process of any one of embodiments 83 to 94, wherein disposing the mixture according to (b') is performed by spraying the mixture onto the substrate or by immerging the substrate in the mixture, preferably by immerging the substrate in the mixture.
96. The process of any one of embodiments 83 to 95, wherein drying according to (c') is performed in a gas atmosphere having a temperature in the range of from 90 to 200° C., preferably in the range of from 120 to 160° C.
97. The process of any one of embodiments 83 to 96, wherein drying according to (c') is performed in a gas atmosphere for a duration in the range of from 5 to 300 minutes, preferably in the range of from 20 to 60 minutes.
98. The process of any one of embodiments 83 to 97, wherein the dried slurry-treated substrate obtained in (c') has a water content in the range of from 0 to 30%, preferably in the range of from 5 to 25%, more preferably in the range of from 15 to 20%.
99. The process of embodiment 96 or 97, wherein the gas atmosphere comprises, preferably is, one or more of air, lean air, and oxygen, more preferably air.
100. The process of any one of embodiments 83 to 99, wherein calcining according to (d') is performed in a gas atmosphere having a temperature in the range of from 300 to 600° C., preferably in the range of from 400 to 550° C.
101. The process of any one of embodiments 83 to 100, wherein calcining according to (d') is performed in a gas atmosphere for a duration in the range of from 5 to 120 minutes, preferably in the range of from 20 to 40 minutes.
102. The process of embodiment 100 or 101, wherein the gas atmosphere comprises, preferably is, one or more of air, lean air, and oxygen, more preferably air.
103. The process of any one of embodiments 83 to 102 consisting of (a), (b), (c), (d) and optionally (b'), (c') and (d').
104. A catalyst, preferably the first catalyst according to (i) in the exhaust gas treatment system of any one of embodiments 1 to 82, obtained or obtainable by a process according to any one of embodiments 83 to 103.
105. Use of the catalyst of embodiment 104 for the selective catalytic reduction of NOx.
106. Use of the exhaust gas treatment according to any one of embodiments 1 to 82 for the treatment of an exhaust gas stream leaving an internal combustion engine, preferably leaving a diesel engine.
107. A method for treating an exhaust gas stream leaving an internal combustion engine, the method comprising
(1) providing an exhaust gas stream from an internal combustion engine, preferably from a diesel engine, the exhaust gas stream comprising one or more of NOx, ammonia, nitrogen monoxide and a hydrocarbon;
(2) passing the exhaust gas stream provided in (1) through the exhaust gas system according to any one of embodiments 1 to 82.

In the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

Furthermore, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

In the context of the present invention, the term "no catalyst is located downstream of the outlet end of the $X^{th}$ catalyst" is to be understood as that there is no catalyst or catalytic component located downstream of the outlet end of the $X^{th}$ catalyst. This does not exclude the presence of one or more injectors as illustrated by the embodiments of the present invention.

In the context of the present invention, the term "substrate width" is to be understood as substrate diameter should the substrate have a cylindrical shape.

In the context of the present invention, the term "consists of" with regard to the weight-% of one or more components indicates the weight-% amount of said component(s) based on 100 weight-% of the entity in question. For example, the wording "wherein from 0 to 0.001 weight-% of the coating of the first catalyst consists of palladium" indicates that among the 100 weight-% of the components of which said coating consists of, 0 to 0.001 weight-% is palladium.

In the context of the present invention, the term "close coupled" catalyst is used herein to define a catalyst which is the first catalyst receiving the exhaust gas stream exiting from an engine (the catalyst is installed close to—immediately adjacent to—the engine without any other catalytic component in between).

In the context of the present invention, the term "an internal combustion engine" refers to a diesel engine or a gasoline engine, preferably a diesel engine.

The present invention is further illustrated by the following Reference Examples, Comparative Examples, and Examples.

EXAMPLES

Reference Example 1: Determination of the Particle Size Distribution (Dv90)

The particle size distributions were determined by a static light scattering method using Sympatec HELOS equipment, wherein the optical concentration of the sample was in the range of from 5 to 10%.

Reference Example 2: Preparation of a CuCHA Zeolite

The zeolitic material having the framework structure type CHA comprising Cu and used in the examples herein was prepared according to the teaching of U.S. Pat. No. 8,293,199 B2. Particular reference is made to Inventive Example 2 of U.S. Pat. No. 8,293,199 B2, column 15, lines 26 to 52.

Reference Example 3: Measurement of the BET Specific Surface Area

The BET specific surface area of the alumina was determined according to DIN 66131 or DINISO 9277 using liquid nitrogen.

Reference Example 4: Preparing a SCR Catalyst Comprising Vanadium ("V-SCR Catalyst" in the Following)

To an aqueous mixture of doped titania powder ($TiO_2$ 87 weight-% with 8 weight-% of $WO_3$ and 5 weight-% of $SiO_2$ with a BET specific surface area of 85 m$^2$/g, a Dv90 of 2.5 micrometers) was added vanadium oxalate and colloidal silica in order to obtain 5% by weight of $V_2O_5$ based on the weight of titania+tungsten oxide+silica in the catalyst after calcination and 2% by weight of silica (from the colloidal silica) in the catalyst after calcination. A portion of the final slurry was disposed over the full length of an uncoated honeycomb flow-through cordierite monolith substrate according to any methods well-known in the art (diameter: 26.67 cm (10.5 inches)×length: 15.24 cm (6 inches) cylindrically shaped substrate with 400/(2.54)$^2$ cells per square centimeter and 0.14 millimeter (5.5 mil) wall thickness). After the coated substrate was dried and calcined, the remaining portion of the final slurry was disposed over the full length of the coated substrate, followed by drying and calcination, to obtain a final loading of the coating in the catalyst of about 4.5 g/in$^3$.

The catalytic activity (NOx conversion) of the obtained catalyst was measured and was displayed in FIG. 1.

Reference Example 5: Preparation of a Diesel Oxidation Catalyst Comprising Palladium ("Pd-DOC" in the Following)

To a Zr-doped alumina powder (20 wt % $ZrO_2$, BET of 200 m$^2$/g, Dv90 of 125 microns and a total pore volume of 0.425 ml/g) was added a palladium nitrate solution. After calcination at 590° C. the final Pd/Zr-alumina had Pd content of 1.5 weight-% based on the weight of Zr-alumina. This material was added to water and the resulting slurry was milled until the resulting Dv90 was 10 microns, as described in Reference Example 1. The final slurry was then disposed over the full length of an uncoated honeycomb flow-through cordierite monolith substrate according to any methods well-known in the art (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness). Afterwards, the substrate was dried and calcined. The loading of the coating after calcination in the catalyst was about 91 g/l (1.5 g/in$^3$) and 40 g/ft$^3$ of Pd.

Reference Example 6: Preparation of a SCR Catalyst Comprising Copper ("Cu-SCR" in the Following)

To an aqueous slurry of Cu-CHA (5.1 weight-% of Cu calculated as CuO and a $SiO_2$: $Al_2O_3$ molar ratio of 18) was added a zirconyl-acetate solution to achieve 5 weight-% of $ZrO_2$ based on the weight of Cu-CHA in the catalyst after calcination. The final slurry was then disposed over the full length of an uncoated honeycomb flow-through cordierite monolith substrate according to any methods well-known in the art (diameter: 26.67 cm (10.5 inches)×length: 15.24 cm (6 inches) cylindrically shaped substrate with 400/(2.54)$^2$ cells per square centimeter and 0.1 millimeter (4 mil) wall thickness). Afterwards, the substrate was dried and calcined. The loading after calcination was of 128.15 g/l (2.1 g/in$^3$).

Reference Example 8.1: Testing of the V-SCR Catalyst of Reference Example 4 and the Cu-SCR Catalyst of Reference Example 6

The DeNOx of the catalysts of Reference Examples 4 and 6 were measured at 210° C. and at a space velocity of 50,000/h to study the responsiveness of said catalysts of Reference Example 4 (V-SCR catalyst) and of the catalyst of Reference Example 6 (Cu-SCR catalyst). Both the V-SCR catalyst as well as the Cu-SCR catalyst were tested under steady-state conditions on an engine in a test cell, with an engine out level of about 550 ppm NOx. As may be taken from FIG. 2, the V-SCR catalyst showed a maximum NOx conversion after about 600 seconds. This figure demonstrates that the V-SCR catalyst of Reference Example 4 is more responsive compared to the Cu-SCR catalyst of reference Example 6. Without being bound by any specific theory is may be assumed that the V-SCR catalyst has faster response at low ammonia storage level; and has less ammonia storage than the Cu-SCR catalyst.

Therefore, Reference Example 8.1 demonstrated that the V-SCR catalyst (Reference Example 4) is a better close-coupled candidate than the Cu-SCR catalyst (Reference Example 6) when fast-response is required.

Comparative Example 1: Preparation of an Exhaust Gas Treatment System not According to the Present Invention An exhaust gas treatment system not according to the present invention was prepared by combining the catalyst of Reference Example 4 ("V-SCR catalyst") and the catalyst of Reference Example 5 ("Pd-DOC"), wherein the catalyst of Reference Example 5 was located downstream of Reference Example 4 and wherein a hydrocarbon (HC) injector was placed upstream of the catalyst of Reference Example 4.

Example 1: Preparation of an Exhaust Gas Treatment System According to the Present Invention An exhaust gas treatment system according to the present invention was prepared by combining the catalyst of Reference Example 4 ("V-SCR catalyst") and the catalyst of Reference Example 5 ("Pd-DOC"), wherein the catalyst of Reference Example 5 was located downstream of Reference Example 4 and wherein a hydrocarbon (HC) injector was placed downstream of the catalyst of Reference Example 4 and upstream of the catalyst of Reference Example 5.

Example 2: Use of the Exhaust Gas Treatment System of Example 1 and of Comparative Example 1—Control of Exotherms in the Systems The temperature at the inlet and outlet ends of the V-SCR catalysts of the two systems and at the inlet and outlet ends of the Pd-DOC of the two systems were measured. The exhaust gas treatment system was directly downstream of the engine in a close-coupled position. HC was injected through the HC injector, the time of the injection is shown on FIGS. 4 and 5.

FIG. 4 shows the inlet and outlet temperatures of the V-SCR catalyst and the outlet temperature of the Pd-DOC of the exhaust gas treatment system of Comparative Example 1 as a function of time when the HC injector is located in front of the V-SCR. At low temperatures, namely lower than 300° C., it appears that there is only a small exotherm across the V-SCR and that the majority of the exotherm occurs across the Pd-DOC. After about 58 minutes, the HC injection was removed and the temperatures at the inlet end of the V-SCR are increased. Without being bound by any specific theory it appears that a fraction of the HC adsorbed on the V-SCR at low temperature and upon temperature increase the adsorbed HC oxidized on the V-SCR catalyst creating an uncontrollable exotherm of temperature above 600° C. Thus, the V-SCR is exposed to temperatures which lie outside its operating window. This can result in its support sintering and loss of surface area and as a consequence a loss in activity. In addition, the 600° C. exposure also creates the potential for Vanadia sublimation.

FIG. 5 shows the inlet temperatures of the V-SCR and Pd-DOC and the outlet temperature of the Pd-DOC as a function of time when the HC injector is placed downstream of the V-SCR catalyst and upstream of the Pd-DOC in the system according to the present invention. Upon turning off the HC injection and raising the inlet temperature, no excessive exotherm was created, implying that HC does not adsorb without oxidation on the Pd-DOC. By location of the HC injector after the V-SCR the high concentration of HC is not passed over the V-SCR, thus ensuring that the V-SCR does not adsorb the HC during active regeneration events. Therefore, Example 2 demonstrates that in addition to providing an exhaust gas treatment system comprising a close-coupled (cc) V-SCR, it is important that the HC injector be downstream of said cc-V-SCR, which will maintain the efficiency and durability of the exhaust gas treatment system.

Reference Example 7: Preparing an AMOX Catalyst

To a Zr-doped alumina powder (20 wt % $ZrO_2$, BET of 200 m$^2$/g, Dv90 of 125 microns and a total pore volume of 0.425 ml/g) is added a platinum ammine solution. After calcination at 590° C. the final Pt/Zr-alumina had a Pt content of 1.85 weight-% based on the weight of Zr-alumina. This material was added to water and the resulting slurry was milled until the resulting Dv90 was 10 microns, as described in Reference Example 1. To an aqueous slurry of Cu-CHA (5.1 weight-% of Cu calculated as CuO and a $SiO_2$: $Al_2O_3$ molar ratio of 18) is added a zirconyl-acetate solution to achieve 5 weight-% of $ZrO_2$ based on the weight of Cu-CHA after calcination. The milled Pt/Zr-alumina slurry was added to the Zr/Cu-CHA slurry and mixed. The final slurry was then disposed over the full length of an uncoated flow-through honeycomb cordierite monolith substrates (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness). Afterwards, the substrate was dried and calcined. The loading of the coating after calcination in the catalyst was about 3.0 g/in$^3$; comprising a loading of 0.28 g/l (8 g/ft$^3$) Pt on 15.26 g/l (0.25 g/in$^3$) Zr-alumina, and 158.66 g/l (2.6 g/in$^3$) Cu-CHA plus 7.93 g/l (0.13 g/in$^3$) $ZrO_2$.

Reference Example 8.2: Testing of Exhaust Gas Treatment Systems Comprising either a cc-V-SCR Catalyst or a cc-Cu-SCR Catalyst—Sulfation Resistance A first exhaust gas treatment system (system 1) was prepared by combining the catalyst of Reference Example 4 (V-SCR catalyst) and the catalyst of Reference Example 7, wherein the catalyst of Reference Example 7 was located downstream of the V-SCR catalyst. A second exhaust gas treatment system (system 2) was prepared by combining the catalyst of Reference Example 6 (Cu-SCR catalyst) and the catalyst of Reference Example 7, wherein the catalyst of Reference Example 7 was located downstream of the Cu-SCR catalyst. The NOx conversion was measured at 215° C. under steady state conditions (engine out NOx=250 ppm; SV=40 k/h at an Ammonia to NOx Ratio (ANR) of 0.85) over a period of 200 hours during simulated low load driving. The results are displayed on FIG. 6.

FIG. 6 shows that the second system with the cc-Cu-SCR catalyst has an initial NOx conversion of almost 60% and a conversion that decays to approximately 40% after 200 h of low temperature operation. The first system comprising the cc-V-SCR catalyst has an initial NOx conversion of approximately 73% which stable over more than 200 hours at a NOx conversion of 66 to 68%. Therefore, this example demonstrated that a hybrid system comprising a cc-V-SCR with a Cu-CHA containing AMOX is more stable than the system which comprises a cc-Cu-CHA with the Cu-CHA containing AMOX as downstream catalyst. Without wanting to be bound to any specific theory, it is believed that a cc-V-SCR catalyst reduces the impact of sulfation and hydrocarbon fouling in an exhaust gas treatment system.

Example 3: Preparation of an Exhaust Gas Treatment System According to the Present Invention An exhaust gas treatment system according to the present invention was prepared by combining in series the catalyst of Reference Example 4 ("V-SCR catalyst"), a hydrocarbon (HC) injector, the catalyst of Reference Example 5 ("Pd-DOC") and the catalyst of Reference Example 6 ("Cu-SCR catalyst), wherein the catalyst of Reference Example 5 was located downstream of the catalyst of Reference Example 4, wherein the catalyst of Reference Example 6 was located downstream of the catalyst of Reference Example 5 and wherein a HC injector was placed downstream of the catalyst of Reference Example 4 and upstream of the catalyst of Reference Example 5.

Reference Example 9: Preparation of a SCR Catalyst Comprising Palladium ("Pd/ZrO$_2$—Cu-SCR Catalyst")

To a zirconium-oxide (with a pore volume of 0.420 ml/g) is added a palladium nitrate solution. After calcination at 590° C. the final Pd/Zirconia had a Pd content of 3.5 weight-% based on the weight of Zr-alumina. This material was added to water and the resulting slurry was milled until the resulting Dv90 was 10 microns, as described in Reference Example 1. To an aqueous slurry of Cu-CHA (with about 3 weight-% of Cu calculated as CuO and a molar ratio SiO$_2$:Al$_2$O$_3$ ratio of about 32), prepared according to Reference Example 2, was added a zirconyl-acetate solution to achieve 5 weight-% ZrO$_2$ after calcination. This mixture was spray-dried and milled until the resulting Dv90 was 5 microns as described in Reference Example 1. The milled Pd/ZrO$_2$ slurry was added to the Zr/Cu-CHA slurry and mixed. The final slurry was then disposed over the full length of an uncoated honeycomb flow-through cordierite monolith substrate (diameter: 26.67 cm (10.5 inches)× length: 7.62 cm (3 inches) cylindrically shaped substrate with 400/(2.54)$^2$ cells per square centimeter and 0.1 millimeter (4 mil) wall thickness). Afterwards, the substrate was dried and calcined. The loading of the coating after calcination in the catalyst was about 3.0 g/in$^3$; comprising a loading of 1.06 g/l (30 g/ft$^3$) Pd on 30.51 g/l (0.5 g/in$^3$) ZrO$_2$, and 144.02 g/l (2.36 g/in$^3$) Cu-CHA plus 7.32 g/l (0.12 g/in$^3$) ZrO$_2$.

Reference Example 10: Preparation of an AMOX Catalyst with a Weight Ratio Pt:Pd of 10:1

To a Zr-doped alumina powder (20 wt % ZrO$_2$, BET of 200 m$^2$/g, Dv90 of 125 microns and a total pore volume of 0.425 ml/g) was added a platinum ammine solution and a palladium nitrate solution in a Pt:Pd weight ratio of 10:1. After calcination at 590° C. the final Pd/Zr-alumina had 1.85 weight-% of Pd and Pt based on the weight of Zr-alumina, with a Pt:Pd weight ratio of 10:1. This material was added to water and the resulting slurry was milled until the resulting Dv90 was 10 microns, as described in Reference Example 1. To an aqueous slurry of Cu-CHA (with about 3 wt % of Cu calculated as CuO and a molar ratio SiO$_2$:Al$_2$O$_3$ ratio of about 32), prepared according to Reference Example 2, was added a zirconyl-acetate solution to achieve 5 weight-% of ZrO$_2$ based on the weight of Cu-CHA after calcination. This mixture was spray-dried and milled until the resulting Dv90 was 5 microns as described in Reference Example 1. The milled Pd/Zr-alumina slurry was added to the Zr/Cu-CHA slurry and mixed. The final slurry was then disposed over the full length of an uncoated flow-through honeycomb cordierite monolith substrate (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness). Afterwards, the substrate was dried and calcined. The loading of the coating after calcination in the catalyst was about 3 g/in$^3$, including 2.75 g/in$^3$ of Cu-CHA, 0.13 g/in$^3$ of ZrO$_2$, 0.25 g/in$^3$ of Zr-alumina, and 8 g/ft$^3$ of Pt+Pd.

Example 4: Preparation of an Exhaust Gas Treatment System According to the Present Invention An exhaust gas treatment system according to the present invention was prepared by combining in series the catalyst of Reference Example 4 ("V-SCR catalyst"), a hydrocarbon (HC) injector, the catalyst of Reference Example 9 ("Pd/ZrO$_2$—Cu-SCR catalyst") and the catalyst of Reference Example 10 ("AMOX catalyst), wherein the catalyst of Reference Example 9 was located downstream of the catalyst of Reference Example 4, wherein the catalyst of Reference Example 10 was located downstream of the catalyst of Reference Example 9 and wherein the HC injector was placed downstream of the catalyst of Reference Example 4 and upstream of the catalyst of Reference Example 9.

Example 5: Preparation of an Exhaust Gas Treatment System According to the Present Invention An exhaust gas treatment system according to the present invention was prepared by combining in series the catalyst of Reference Example 4 ("V-SCR catalyst"), a hydrocarbon (HO) injector, the catalyst of Reference Example 5 ("Pd-DOC"), the catalyst of Reference Example 6 ("Cu-SCR catalyst) and the catalyst of Reference Example 7 ("AMOX catalyst"), wherein the catalyst of Reference Example 5 was located downstream of the catalyst of Reference Example 4, wherein the catalyst of Reference Example 6 was located downstream of the catalyst of Reference Example 5, wherein the catalyst of Reference Example 7 was located downstream of the catalyst of Reference Example 6 and wherein the HC injector was placed downstream of the catalyst of Reference Example 4 and upstream of the catalyst of Reference Example 5.

Example 6: Preparation of an Exhaust Gas Treatment System According to the Present Invention An exhaust gas treatment system according to the present invention was prepared by combining in series the catalyst of Reference Example 4 ("V-SCR catalyst"), a hydrocarbon (HO) injector, the catalyst of Reference Example 5 ("Pd-DOC"), the catalyst of Reference Example 9 ("Pd/ZrO$_2$—Cu-SCR catalyst") and the catalyst of Reference Example 10 ("AMOX catalyst), wherein the catalyst of Reference Example 5 was located downstream of the catalyst of Reference Example 4, wherein the catalyst of Reference Example 9 was located downstream of the catalyst of Reference Example 5, wherein the catalyst of Reference Example 10 was located downstream of the catalyst of Reference Example 9 and wherein the HC injector was placed downstream of the catalyst of Reference Example 4 and upstream of the catalyst of Reference Example 5.

Reference Example 11: Preparation of a Diesel Oxidation Catalyst Comprising Palladium ("Pd-DOC2" in the Following)

The Pd-DOC of Reference Example 11 was prepared as the Pd-DOC of Reference Example 5 except that a lower amount of palladium was used. The loading of the coating after calcination in the catalyst was about 91 g/l (1.5 g/in$^3$) and 30 g/ft$^3$ of Pd.

Example 7: Preparation of an Exhaust Gas Treatment System According to the Present Invention An exhaust gas treatment system according to the present invention was prepared by combining in series the catalyst of Reference Example 4 ("V-SCR catalyst"—Cat. 1), a hydrocarbon (HC) injector, the catalyst of Reference Example 11 ("Pd-DOC2"—Cat. 2) and the catalyst of Reference Example 6 ("Cu-SCR catalyst"—Cat. 3), wherein the catalyst of Reference Example 11 was located downstream of the catalyst of Reference Example 4, wherein the catalyst of Reference Example 6 was located downstream of the catalyst of Reference Example 11 and wherein the HC injector was placed downstream of the catalyst of Reference Example 4 and upstream of the catalyst of Reference Example 11.

Example 8: Preparation of an Exhaust Gas Treatment System According to the Present Invention An exhaust gas treatment system according to the present invention was prepared by combining in series the catalyst of Reference Example 4 ("V-SCR catalyst"—Cat. 1), a hydrocarbon (HC) injector, the catalyst of Reference Example 9 ("Pd/ZrO$_2$—Cu-SCR catalyst"—Cat. 2) and the catalyst of Reference Example 6 ("Cu-SCR catalyst"—Cat. 3), wherein the catalyst of Reference Example 9 was located downstream of the catalyst of Reference Example 4, wherein the catalyst of Reference Example 6 was located downstream of the catalyst of Reference Example 9 and wherein the HC injector was placed downstream of the catalyst of Reference Example 4 and upstream of the catalyst of Reference Example 9.

Reference Example 12: Preparation of a Diesel Oxidation Catalyst Comprising Platinum ("Pt-DOC" in the Following)

To a titania powder (TiO$_2$ 100 weight-% with a BET specific surface area of 200 m$^2$/g, a Dv90 of 20 micrometers) was wet impregnated with a platinum ammine solution. The amount of titania was calculated such that the loading of titania in the catalyst after calcination was of 0.75 g/in$^3$. After calcination at 590° C. the final Pt/TiO$_2$ had Pt content of around 1.7 weight-% based on the weight of titania. This material was added to acetic acid and water forming a Pt/titania slurry. In parallel, a binder slurry was prepared with alumina (100 wt %, with a BET specific surface area of about 200 m$^2$/g) mixed with a diluted solution of nitric acid (HNO$_3$), the amount of alumina was calculated such that the alumina loading in the catalyst after calcination was of 0.2 g/in$^3$. To this alumina slurry, a zirconium acetate solution (mixture of acetic acid and zirconium hydroxide) was added, the amount of alumina was calculated such that the alumina loading in the catalyst after calcination was of 0.25 g/in$^3$. The obtained mixture was milled until the resulting Dv90 was 10 microns, measured as described in Reference Example 1. Finally, the Al/Zr mixture and the Pt/TiO$_2$ slurry were admixed with octanol forming a final slurry having a pH of about 4.5.

The final slurry was then disposed over the full length of an uncoated honeycomb flow-through cordierite monolith substrate according to any methods well-known in the art (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness. Afterwards, the substrate was dried and calcined. The loading of the coating after calcination in the catalyst was about 62 g/l (about 1 g/in$^3$) and about 22 g/ft$^3$ of Pt.

Comparative Example 2: Preparation of an Exhaust Gas Treatment System Not According to the Present Invention An exhaust gas treatment system not according to the present invention was prepared by combining in series the catalyst of Reference Example 4 ("V-SCR catalyst"—Cat. 1), a hydrocarbon (HC) injector, the catalyst of Reference Example 12 ("Pt-DOC"—Cat. 2) and the catalyst of Reference Example 6 ("Cu-SCR catalyst"—Cat. 3), wherein the catalyst of Reference Example 12 was located downstream of the catalyst of Reference Example 4, wherein the catalyst of Reference Example 6 was located downstream of the catalyst of Reference Example 12 and wherein the HC injector was placed downstream of the catalyst of Reference Example 4 and upstream of the catalyst of Reference Example 12.

Example 9: Use of the Exhaust Gas Treatment Systems of Examples 7, 8 and of Comparative Example 2—DeNOx and N$_2$O Formation The exhaust gas treatment system of Example 7 (system A), the exhaust gas treatment system of Example 8 (system B) and the exhaust gas treatment system of Comparative Example 2 (system C) were tested under steady state (Load Point: at 290° C., space velocity: 1100 kg/h—E.O. NOx=670 ppm) and transient (WHTC test cycle with an E.O. (Engine Out) NOx of around 300 g (cum.) with an average temperature over the cycle of 235° C.—Tmax=330° C.; Tmin=170° C.—ANR (ammonia to NOx ratio)=1.05). The results are displayed on FIGS. 7-10.

FIGS. 7 and 8 show that using Pt/TiO$_2$ (Pt-DOC) as the second catalyst (Cat. 2) of an exhaust gas treatment system does not significantly reduce the NOx conversion measured at the outlet end of Cat. 2 but results in a lower NOx conversion of at least 10% at the outlet end of the exhaust gas treatment system C (not according to the present invention). Further, there is a tremendous increase of the nitrous oxide formation when using Pt/TiO$_2$ (Pt-DOC) as the second catalyst (Cat. 2) at the outlet end of the second and third catalysts (Cat. 2 and 3). Comparative results can be seen on FIGS. 9 and 10. Thus, without wanted to be bound to any specific theory, it is believed that the second catalyst comprising Pt/TiO2 oxidizes the reductant (ammonia) that slips out of the first catalyst to nitrous oxide which results in the reduction of NOx conversion at the outlet end of the system. Therefore, Example 9 demonstrates that using Pd-DOC or a Pd/ZrO2-Cu-SCR, as a second catalyst in an exhaust gas treatment system, permits to improve the NOx reduction while reducing drastically the nitrous formation compared to a second catalyst which comprises platinum on titania.

CITED LITERATURE

Figure 1:
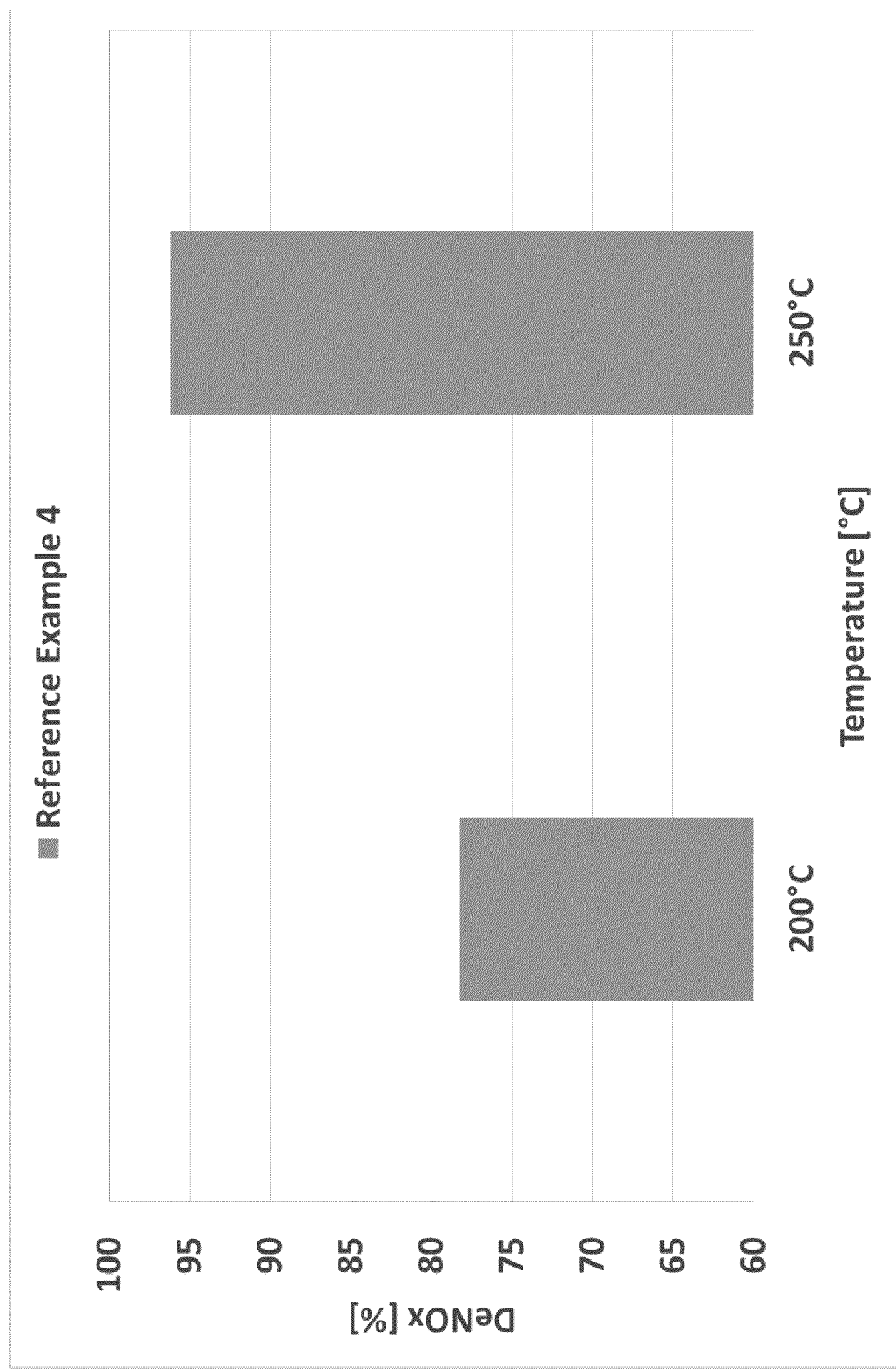
FIG. 1 shows the NOx conversion of the V-SCR catalyst of Reference Example 4 at two different temperatures, namely at 200 and 250° C. The NOx conversion was measured at a space velocity of 50,000/hr, NO 500 ppm an NH$_3$ 500 ppm. It was apparent from this figure that the efficiency of the V-SCR catalyst is increased at higher temperatures, in particular the DeNOx is of about 78% at 200° C. and increased to more than 95% at 250° C.
Figure 2:
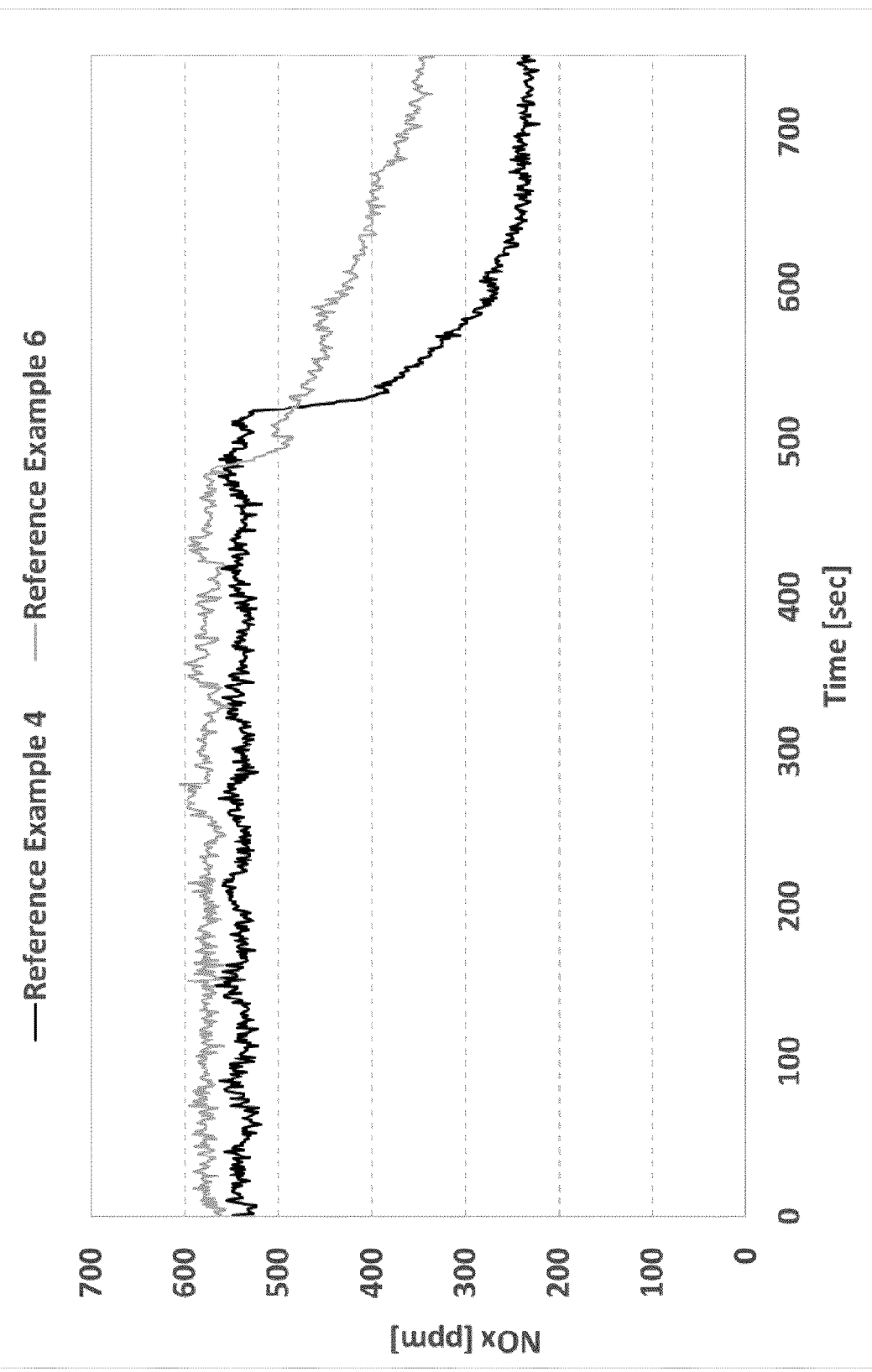
FIG. 2 shows the responsiveness of the catalysts of Reference Example 4 (V-SCR catalyst) and of the catalyst of Reference Example 6 (Cu-SCR catalyst). The DeNOx was measured at 210° C. and a space velocity of 50,000/hr.
Figure 3:
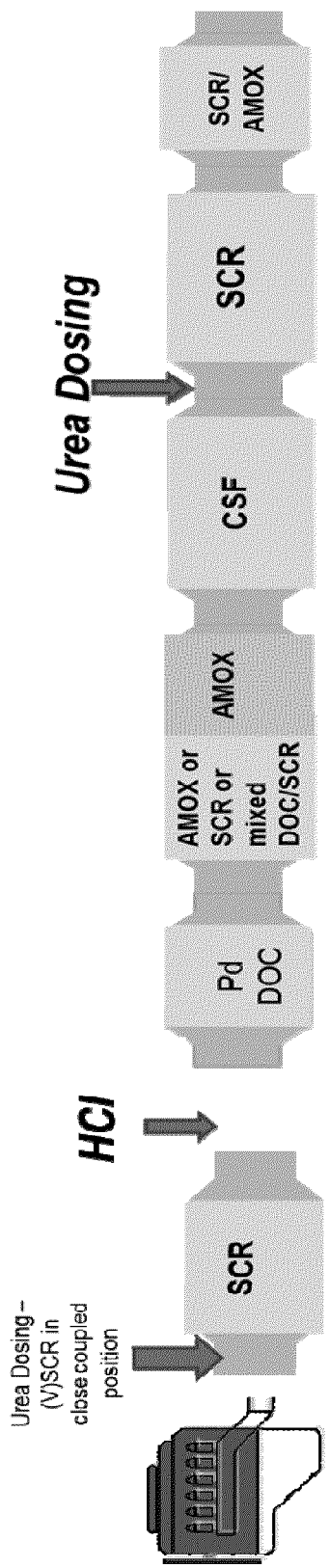
FIG. 3 shows a schematic view of an engine followed by an exhaust gas treatment system according to the present invention. In particular, the exhaust gas treatment system comprises a SCR catalyst, namely a V-SCR catalyst, a Pd-DOC which is located downstream of the V-SCR catalyst. Further, a HC injector is placed between the outlet end of the V-SCR catalyst and the inlet end of the Pd-DOC, and a first urea injector is placed upstream of the inlet end of the V-SCR catalyst. Further, the system comprises one of a first ammonia oxidation catalyst, a SCR catalyst and a mixed DOC/SCR, located downstream of the Pd-DOC. The system further comprises a second ammonia oxidation (AMOX) catalyst, and optionally a DOC at its outlet end. The system further comprises a catalyzed soot filter (CSF) downstream of the second AMOX catalyst and upstream of a SCR catalyst. Further a second urea injector is placed between the CSF and the SCR catalyst. Finally, the system further comprises a SCR catalyst or an AMOX catalyst.
Figure 4:
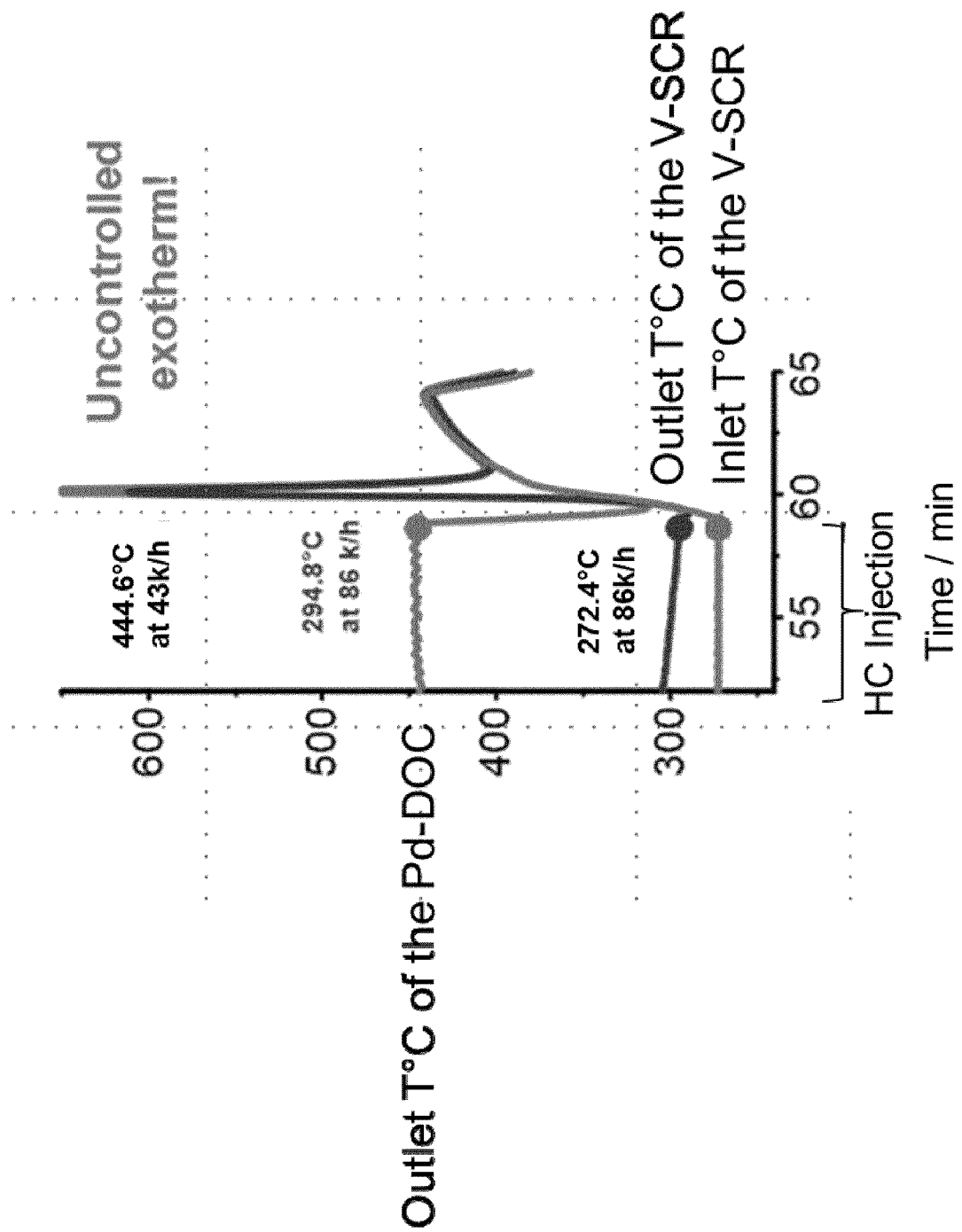
FIG. 4 shows the temperatures at the inlet and outlet ends of the V-SCR catalyst in the system of Comparative Example 1 and the temperature at the outlet end of the Pd-DOC of the system of Comparative Example 1 relative to the time.
Figure 5:
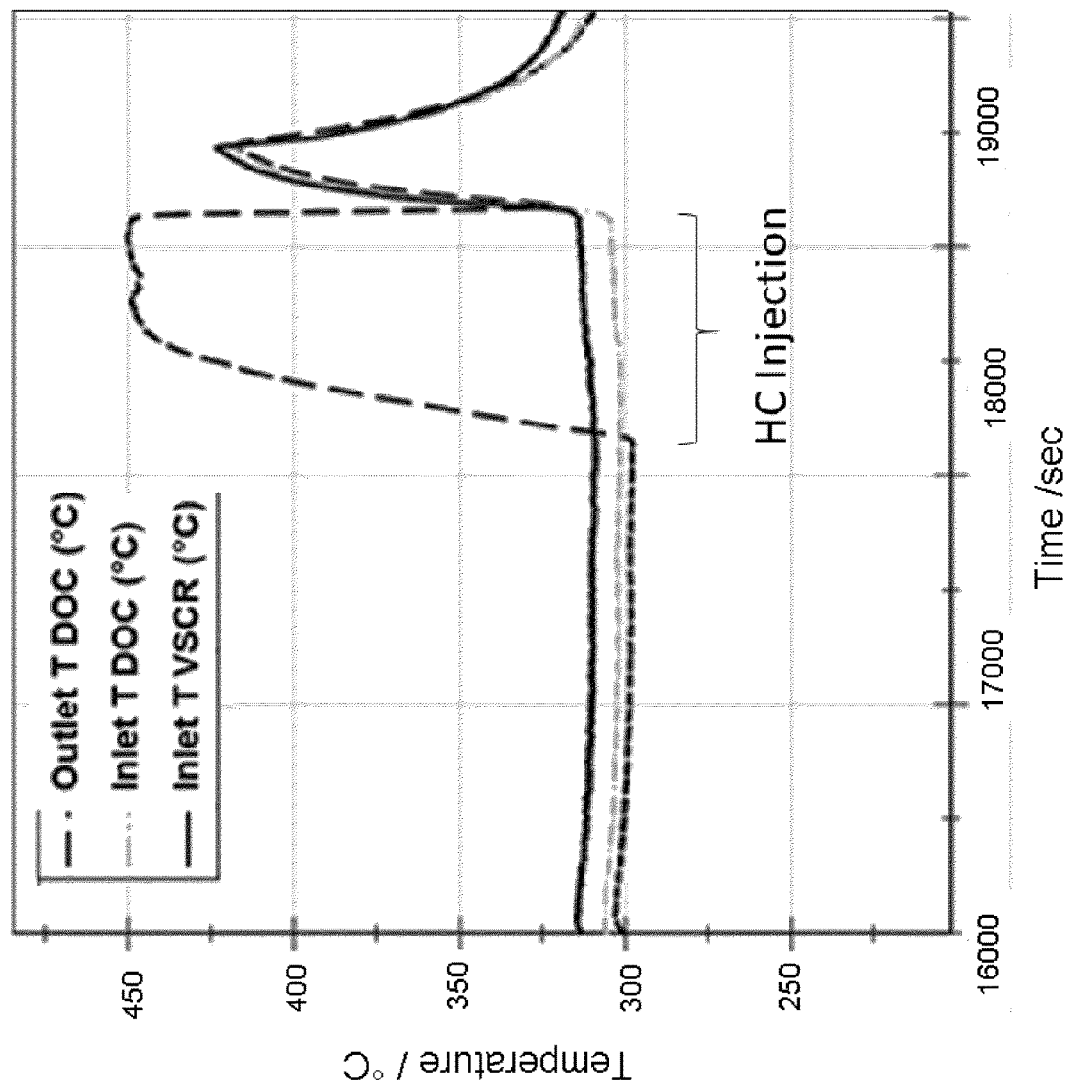
FIG. 5 shows the temperatures at the inlet and outlet ends of the Pd-DOC in the system of Example 1 relative to the time during a hydrocarbon injection event. In addition, the temperature of the upstream V-SCR is shown.
Figure 6:
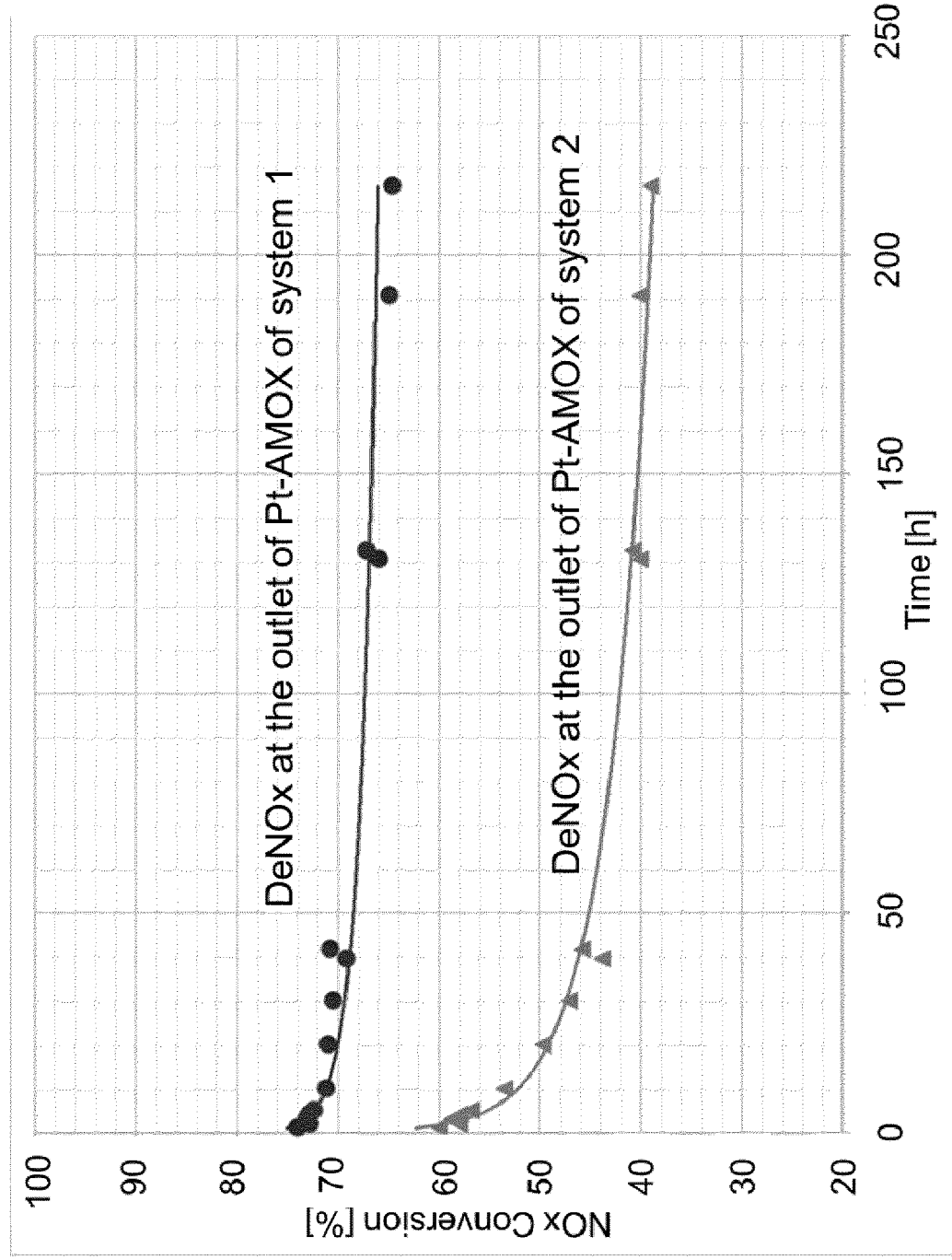
FIG. 6 shows the NOx conversion was measured at 215° C. under steady state conditions at the outlet of systems 1 and 2.
Figure 7:
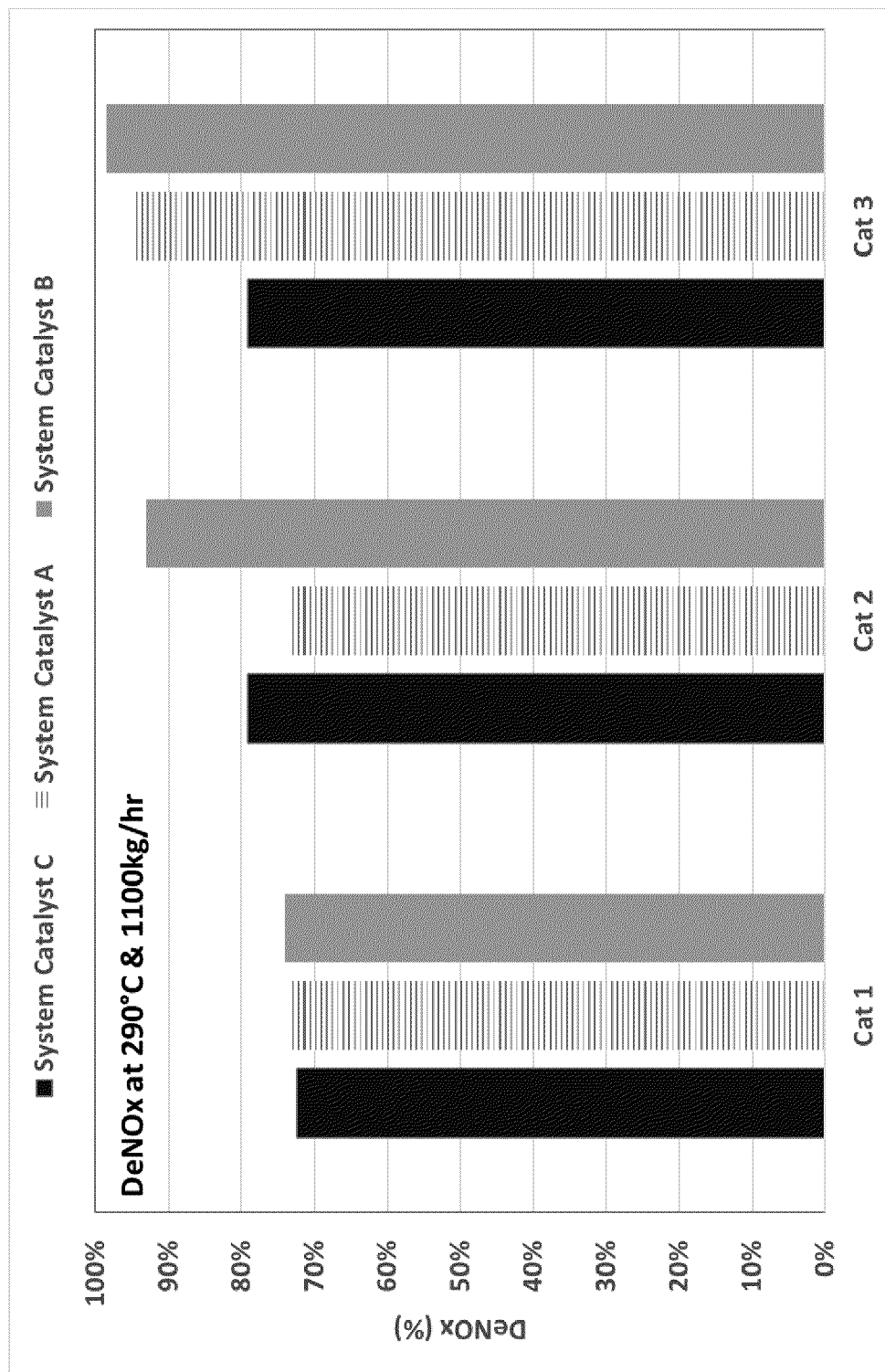
FIG. 7 shows the NOx conversion at the outlet end of the different catalysts forming the systems A, B and C at 290° C. (steady state).
Figure 8:
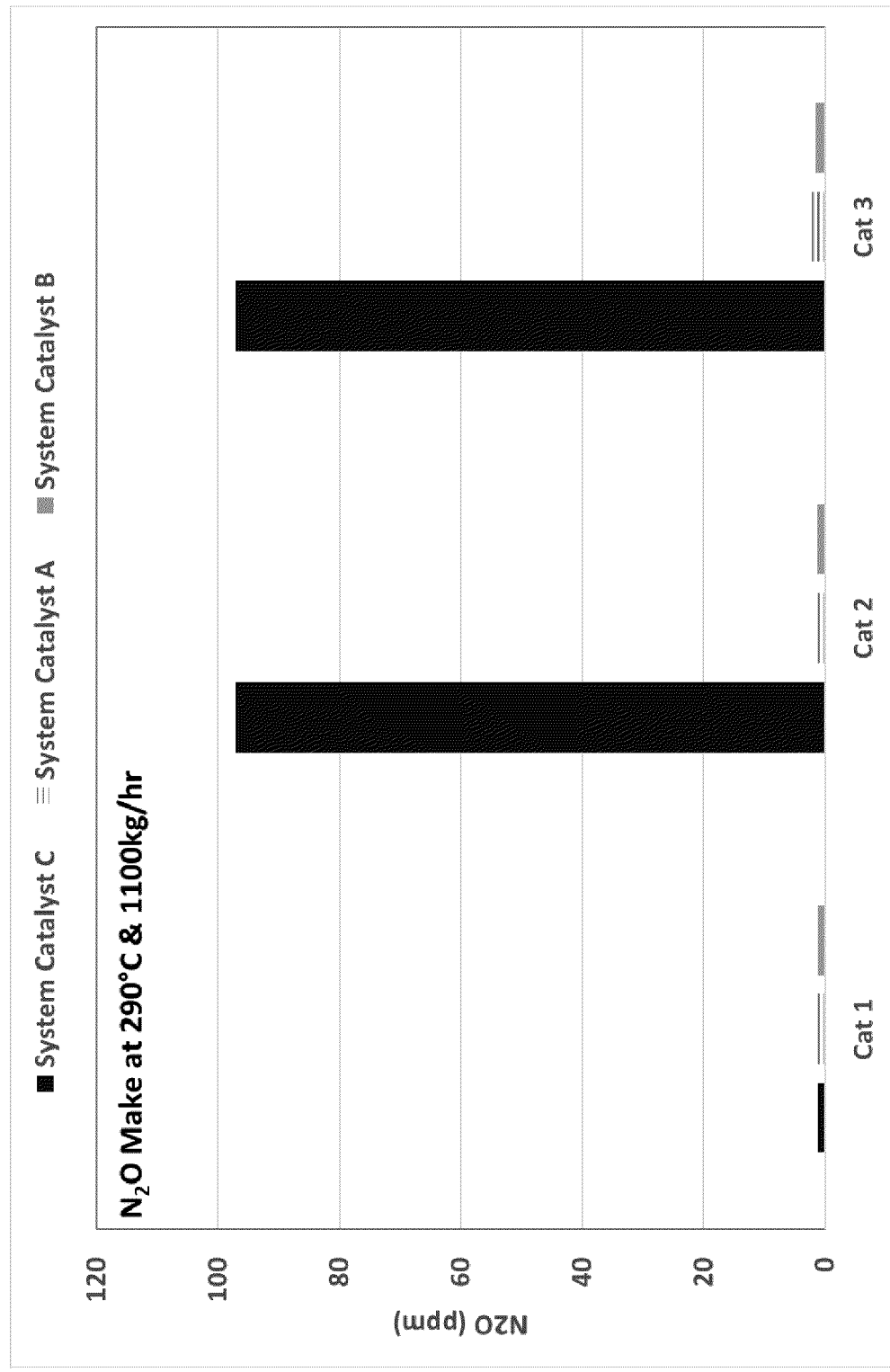
FIG. 8 shows the nitrous oxide formed at the outlet end of the different catalysts forming the systems A, B and C at 290° C. (steady state).
Figure 9:
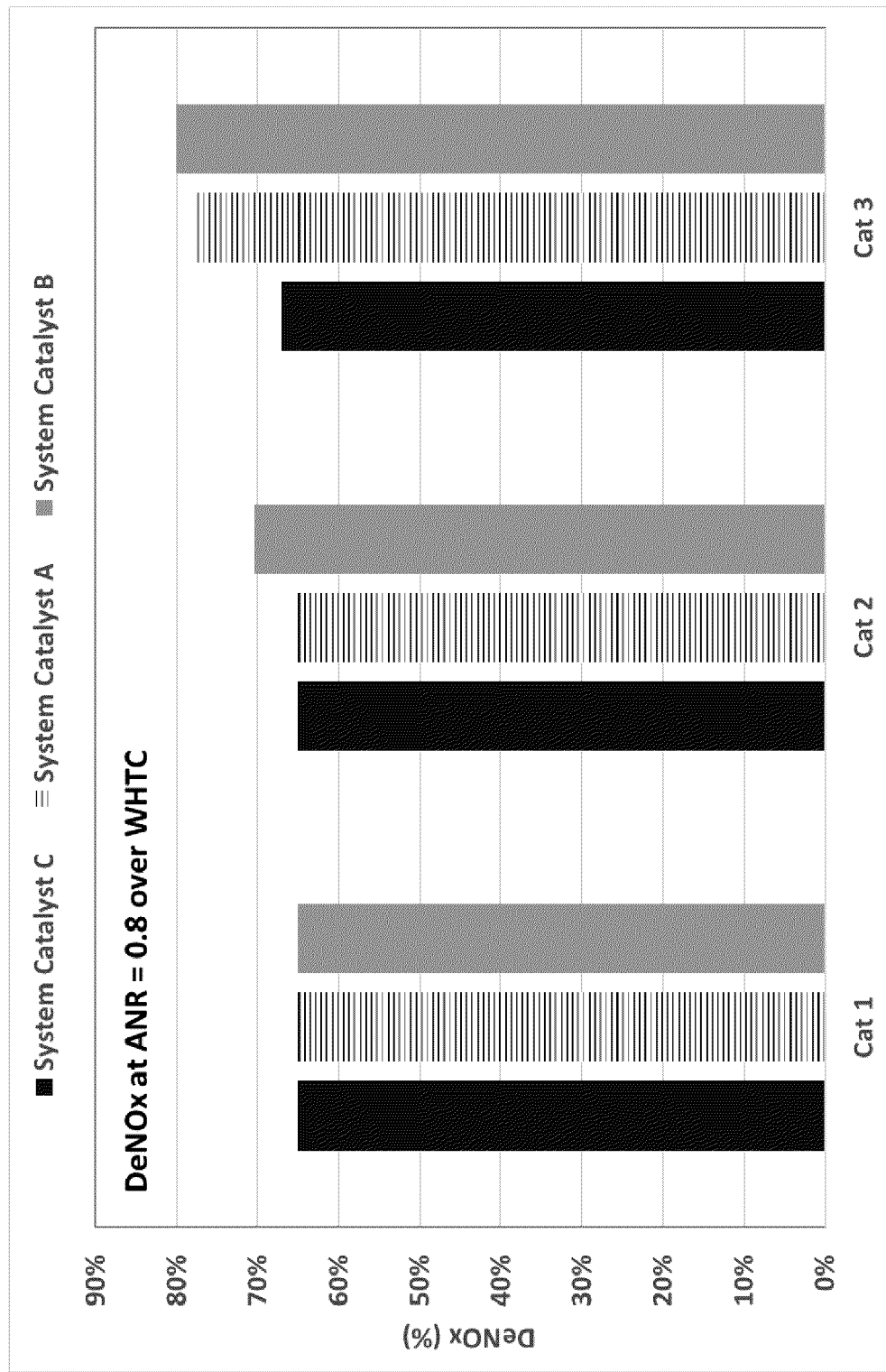
FIG. 9 shows the NOx conversion at the outlet end of the different catalysts forming the systems A, B and C over a WHTC (transient).
Figure 10:
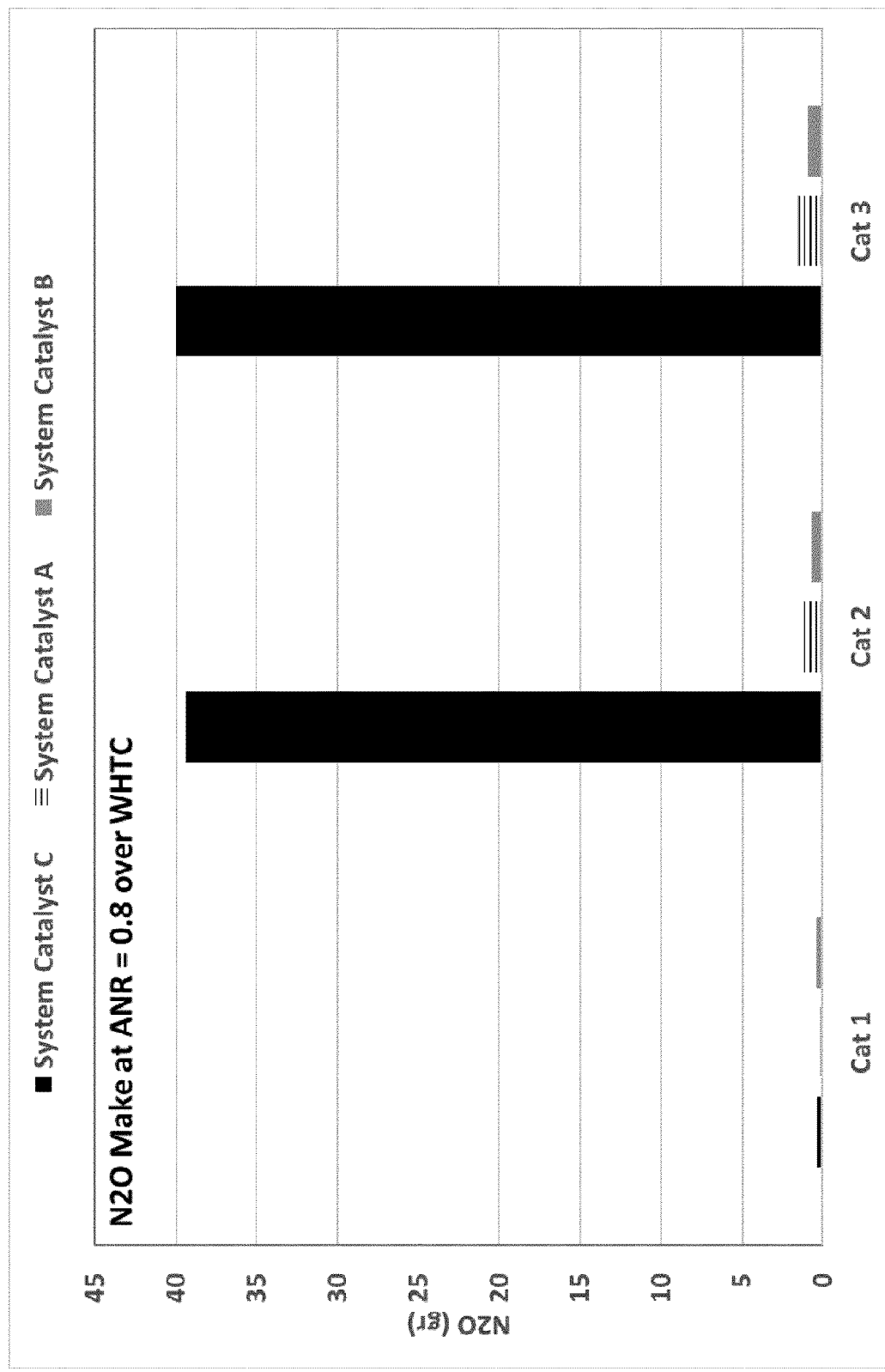
FIG. 10 shows the nitrous oxide formed at the outlet end of the different catalysts forming the systems A, B and C over a WHTC (transient).

US 2017/152780 A1
US 2018/258811 A1
WO 2018/224651 A2

The invention claimed is:

1. An exhaust gas treatment system for treating an exhaust gas stream leaving an internal combustion engine, the exhaust gas treatment system having an upstream end for introducing the exhaust gas stream into the exhaust gas treatment system, wherein the exhaust gas treatment system comprises
(i) a first catalyst having an inlet end and an outlet end and comprising a coating and a first substrate, wherein the first substrate has an inlet end, an outlet end and a substrate axial length extending from the inlet end to the outlet end of the first substrate and comprises a plurality of passages defined by internal walls, wherein the interface between the passages and the internal walls is defined by the surface of the internal walls, wherein the coating is disposed on the surface of the internal walls of the first substrate and the coating comprises a vanadium oxide supported on a first oxidic support comprising titanium;
(ii) a hydrocarbon injector for injecting a fluid comprising hydrocarbons into the exhaust gas stream exiting the outlet end of the first catalyst according to (i); and
(iii) a second catalyst having an inlet end and an outlet end and comprising a coating and a second substrate, wherein the second substrate has an inlet end, an outlet end and a substrate axial length extending from the inlet end to the outlet end of the second substrate and comprises a plurality of passages defined by internal walls, wherein the interface between the passages and the internal walls is defined by the surface of the internal walls, wherein the coating is disposed on the surface of the internal walls of the second substrate and the coating comprises palladium on a second oxidic support comprising one or more of zirconium, silicon, aluminum and titanium;
wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;
wherein in the exhaust gas treatment system, the second catalyst according to (iii) is located downstream of the first catalyst according to (i) and downstream of the hydrocarbon injector according to (ii) and wherein the inlet end of the second catalyst is arranged upstream of the outlet end of the second catalyst; and
wherein the coating of the second catalyst according to (iii) further comprises a zeolitic material, the zeolitic material comprising one or more of Cu and Fe, and the coating of the second catalyst according to (iii) further comprises from 0.5 weight-% to 10 weight-% of an oxidic binder, based on the total weight of the zeolitic material.

2. The system of claim 1, wherein the coating of the first catalyst comprises the vanadium oxide at an amount ranging from 1.0 weight-% to 10 weight-%, based on the weight of the first oxidic support.

3. The system of claim 1, wherein the first oxidic support further comprises one or more of tungsten, silicon, zirconium, and antimony;
wherein the first oxidic support has from 80 weight-% to 98 weight-% titania, calculated as $WO_3$.

4. The system of claim 1 wherein the second oxidic support comprises one or more of zirconium and aluminum;
wherein the second oxidic support has a total of from 90 weight-% to 100 weight-%, aluminum, oxygen and optionally zirconium.

5. The system of claim 1, wherein the coating of the second catalyst according to (iii) comprises palladium ranging from 5 $g/ft^3$ to 90 $g/ft^3$.

6. The system of claim 5, wherein palladium is the only platinum group metal present in the coating of the second catalyst according to (iii).

7. The system of claim 1, wherein the coating of the second catalyst has from 98 weight-% to 100 weight-% palladium supported on the second oxidic support; wherein the second oxidic support comprises one or more of zirconium, silicon, aluminum, and titanium.

8. The system of claim 1, further comprising an injector for injecting a fluid into the exhaust gas stream exiting the internal combustion engine, the injector being located upstream of the first catalyst and downstream of the upstream end of the exhaust gas treatment system;
wherein no hydrocarbon injector is located upstream of the first catalyst and downstream of the upstream end of the exhaust gas treatment system.

9. An exhaust gas treatment system for treating an exhaust gas stream leaving an internal combustion engine, the exhaust gas treatment system having an upstream end for introducing the exhaust gas stream into the exhaust gas treatment system, wherein the exhaust gas treatment system comprises:
- (i) a first catalyst having an inlet end and an outlet end and comprising a coating and a first substrate, wherein the first substrate has an inlet end, an outlet end and a substrate axial length extending from the inlet end to the outlet end of the first substrate and comprises a plurality of passages defined by internal walls, wherein the interface between the passages and the internal walls is defined by the surface of the internal walls, wherein the coating is disposed on the surface of the internal walls of the first substrate and the coating comprises a vanadium oxide supported on a first oxidic support comprising titanium;
- (ii) a hydrocarbon injector for injecting a fluid comprising hydrocarbons into the exhaust gas stream exiting the outlet end of the first catalyst according to (i); and
- (iii) a second catalyst having an inlet end and an outlet end and comprising a coating and a second substrate, wherein the second substrate has an inlet end, an outlet end and a substrate axial length extending from the inlet end to the outlet end of the second substrate and comprises a plurality of passages defined by internal walls, wherein the interface between the passages and the internal walls is defined by the surface of the internal walls, wherein the coating is disposed on the surface of the internal walls of the second substrate and the coating comprises palladium on a second oxidic support comprising one or more of zirconium, silicon, aluminum and titanium; and
- (iv) a third catalyst having an inlet end and an outlet end and comprising a coating and a third substrate, wherein the third substrate has an inlet end, an outlet end and a substrate axial length extending from the inlet end to the outlet end of the third substrate and comprises a plurality of passages defined by internal walls, wherein the interface between the passages and the internal walls is defined by the surface of the internal walls, wherein the coating is disposed on the surface of the internal walls of the third substrate and the coating comprises one or more of a vanadium oxide and a zeolitic material comprising one or more of Cu and Fe;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst wherein in the exhaust gas treatment system, the second catalyst according to (iii) is located downstream of the first catalyst according to (i) and downstream of the hydrocarbon injector according to (ii) and wherein the inlet end of the second catalyst is arranged upstream of the outlet end of the second catalyst wherein in the exhaust gas treatment system, the third catalyst according to (iv) is located downstream of the second catalyst according to (iii) and wherein the inlet end of the third catalyst is arranged upstream of the outlet end of the third catalyst;

wherein the outlet end of the second catalyst according to (iii) is in fluid communication with the inlet end of the third catalyst according to (iv) and wherein between the outlet end of the second catalyst according to (iii) and the inlet end of the third catalyst according to (iv), no catalyst for treating the exhaust gas stream exiting the second catalyst is located in the exhaust gas treatment system.

10. The system of claim 9, wherein the coating of the third catalyst according to (iv) comprises a zeolitic material comprising one or more of Cu and Fe; wherein the zeolitic material has a framework type AEI, GME, CHA, MFI, BEA, FAU, MOR or mixtures of two or more thereof.

11. The system of claim 9, wherein the coating of the second catalyst according to (iii) comprises palladium supported on the second oxidic support comprising one or more of zirconium, silicon, aluminum and titanium, and wherein the coating of the third catalyst according to (iv) comprises a zeolitic material comprising one or more of Cu and Fe.

12. The system of claim 9, further comprising a fourth catalyst, wherein the fourth catalyst is one or more of an ammonia oxidation catalyst, a catalyzed soot filter and a selective catalytic reduction catalyst;
- wherein the fourth catalyst has an inlet end and an outlet end and comprises a coating and a fourth substrate, wherein the fourth substrate has an inlet end, an outlet end and a substrate axial length extending from the inlet end to the outlet end of the fourth substrate and comprises a plurality of passages defined by internal walls, wherein the interface between the passages and the internal walls is defined by the surface of the internal walls, wherein the coating is disposed on the surface of the internal walls of the fourth substrate and the coating comprises an ammonia oxidation component,
- wherein in the exhaust gas treatment system, the fourth catalyst is located downstream of the third catalyst according to (iv) and wherein the inlet end of the fourth catalyst is arranged upstream of the outlet end of the fourth catalyst;
- wherein the outlet end of the third catalyst according to (iv) is in fluid communication with the inlet end of the fourth catalyst and wherein between the outlet end of the third catalyst and the inlet end of the fourth catalyst, no catalyst for treating the exhaust gas exiting the third catalyst is located in the exhaust gas treatment system.

13. A method for treating an exhaust gas stream leaving an internal combustion engine, the method comprising:
- (1) providing an exhaust gas stream from an internal combustion engine, wherein the exhaust gas stream comprises one or more of NOx, ammonia, nitrogen monoxide, and a hydrocarbon;
- (2) passing the exhaust gas stream provided in (1) through the exhaust gas system according to claim 1.

14. A method for treating an exhaust gas stream leaving an internal combustion engine, the method comprising:
- (1) providing an exhaust gas stream from an internal combustion engine, wherein the exhaust gas stream comprises one or more of NOx, ammonia, nitrogen monoxide, and a hydrocarbon;
- (2) passing the exhaust gas stream provided in (1) through the exhaust gas system according to claim 9.

15. An exhaust gas treatment system for treating an exhaust gas stream leaving an internal combustion engine, said exhaust gas treatment system having an upstream end for introducing said exhaust gas stream into said exhaust gas treatment system, wherein said exhaust gas treatment system comprises
- (i) a first catalyst having an inlet end and an outlet end and comprising a coating and a first substrate, wherein the first substrate has an inlet end, an outlet end and a substrate axial length extending from the inlet end to the outlet end of the first substrate and comprises a plurality of passages defined by internal walls, wherein the interface between the passages and the internal walls is defined by the surface of the internal walls, wherein the coating is disposed on the surface of the internal walls of the first substrate and the coating comprises a vanadium oxide supported on a first oxidic support comprising titanium;

(ii) a hydrocarbon injector for injecting a fluid comprising hydrocarbons into the exhaust gas stream exiting the outlet end of the first catalyst according to (i);

(iii) a second catalyst having an inlet end and an outlet end and comprising a coating and a second substrate, wherein the second substrate has an inlet end, an outlet end and a substrate axial length extending from the inlet end to the outlet end of the second substrate and comprises a plurality of passages defined by internal walls, wherein the interface between the passages and the internal walls is defined by the surface of the internal walls, wherein the coating is disposed on the surface of the internal walls of the second substrate and the coating comprises palladium on a second oxidic support comprising one or more of zirconium, silicon and aluminum;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (iii) is located downstream of the first catalyst according to (i) and downstream of the hydrocarbon injector according to (ii) and wherein the inlet end of the second catalyst is arranged upstream of the outlet end of the second catalyst.

* * * * *